(12) United States Patent
Karanicolas et al.

(10) Patent No.: US 12,465,637 B2
(45) Date of Patent: Nov. 11, 2025

(54) COMPOSITIONS AND METHODS FOR MODULATION OF ANTIBODY ACTIVITY

(71) Applicants: Institute for Cancer Research, Philadelphia, PA (US); University of Kansas, Lawrence, KS (US)

(72) Inventors: John Karanicolas, Philadelphia, PA (US); Jittasak Khowsathit, Philadelphia, PA (US); Daniel Pushparaju Yeggoni, Philadelphia, PA (US)

(73) Assignees: Institute for Cancer Research, Philadelphia, PA (US); University of Kansas, Lawrence, KS (US)

( * ) Notice: Subject to any disclaimer, the term of this patent is extended or adjusted under 35 U.S.C. 154(b) by 974 days.

(21) Appl. No.: 17/600,831

(22) PCT Filed: Apr. 29, 2020

(86) PCT No.: PCT/US2020/030354
§ 371 (c)(1),
(2) Date: Oct. 1, 2021

(87) PCT Pub. No.: WO2020/223273
PCT Pub. Date: Nov. 5, 2020

(65) Prior Publication Data
US 2022/0175918 A1 Jun. 9, 2022

Related U.S. Application Data

(60) Provisional application No. 62/840,465, filed on Apr. 30, 2019.

(51) Int. Cl.
*A61K 39/395* (2006.01)
*A61K 31/137* (2006.01)
(Continued)

(52) U.S. Cl.
CPC ........ *A61K 39/3955* (2013.01); *A61K 31/137* (2013.01); *A61K 31/404* (2013.01);
(Continued)

(58) Field of Classification Search
CPC .............. A61K 39/3955; A61K 31/137; A61K 31/404; A61K 31/416; A61K 31/517;
(Continued)

(56) References Cited

U.S. PATENT DOCUMENTS 6,737,056 B1 * 5/2004 Presta ................... C07K 16/18
530/387.3
2002/0048578 A1 4/2002 Waldmann et al.
(Continued)

FOREIGN PATENT DOCUMENTS

WO 2011/059762 A1 5/2011
WO 2016/149201 A2 9/2016
WO 2017/187274 A1 11/2017

OTHER PUBLICATIONS

Christopoulos et al. (International Union of Basic and Clinical Pharmacology. XC. Multisite Pharmacology: Recommendations for the Nomenclature of Receptor Allosterism and Allosteric Ligands. Pharmacol., 66:918-947) (Year: 2014).*
(Continued)

*Primary Examiner* — Misook Yu
(74) *Attorney, Agent, or Firm* — BALLARD SPAHR LLP

(57) ABSTRACT

Compositions and methods for modulating antibody activity are disclosed.

26 Claims, 12 Drawing Sheets

Figure 1A:
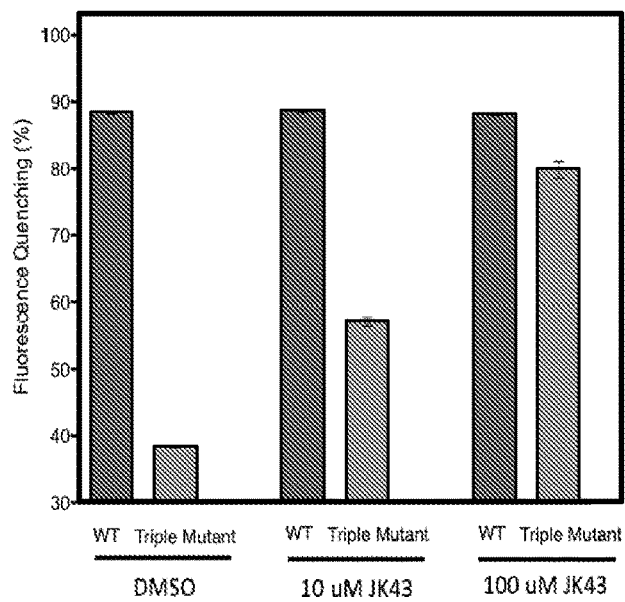

Specification includes a Sequence Listing.

(51) Int. Cl.
  *A61K 31/404* (2006.01)
  *A61K 31/416* (2006.01)
  *A61K 31/517* (2006.01)
  *A61P 35/00* (2006.01)
  *C07K 16/28* (2006.01)
(52) U.S. Cl.
  CPC .......... *A61K 31/416* (2013.01); *A61K 31/517* (2013.01); *A61P 35/00* (2018.01); *C07K 16/2818* (2013.01); *C07K 2317/55* (2013.01); *C07K 2317/622* (2013.01)
(58) Field of Classification Search
  CPC . A61P 35/00; C07K 16/2818; C07K 2317/55; C07K 2317/622
  See application file for complete search history.

(56) References Cited

U.S. PATENT DOCUMENTS

2014/0057282 A1 2/2014 Dulgar-Tulloch et al.
2014/0200331 A1 7/2014 Corper et al.
2016/0152726 A1 6/2016 Kim

OTHER PUBLICATIONS

Fournier et al. (Allosteric antibodies: a novel paradigm in drug discovery. Trends in Pharmacological Sciences, vol. xx, No. xx pp. 1-13) (Year: 2024).*

Kellmann et al. (2017) "A strategy to identify linker-based modules for the allosteric regulation of antibody-antigen binding affinities of different scFvs," *MABS* 9(3): 404-418.

Khersonsky and Fleishman (2017) "Incorporating an allosteric regulatory site in an antibody through backbone design," *Protein Science* 27(4): 807-813.

Kaiser, et al., "Modulating Antibody Structure and Function through Directed Mutations and Chemical Rescue" ACS Synth. Biol. (2018) 7(4):1152-1162.

Rabia, et al., "Understanding and overcoming trade-offs between antibody affinity, specificity, stability and solubility" Biochem. Eng. J. (2018) 137:365-374.

Khowsathit, J., "Using Chemical Biology to Modulate Antibody Activity" Ph.D. Thesis, University opf Kansas (2019) available at https://kuscholarworks.ku.edu/handle/1808/29885.

Khowsathit, et al., "Computational Design of an Allosteric Antibody Switch by Deletion and Rescue of a Complex Structural Constellation" ACS Cent. Sci. (2020) 6(3):390-403.

Matthews, et al., "A review about nothing: are apolar cavities in proteins really empty?" Protein Sci. (2009) 18(3):494-502.

Xia, et al., "The designability of protein switches by chemical rescue of structure: mechanisms of inactivation and reactivation" J. Am. Chem. Soc. (2013) 135(50):18840-9.

Deckert, et al., "Designing allosteric control into enzymes by chemical rescue of structure" J. Am. Chem. Soc. (2012) 134(24):10055-60.

Budiardjo, et al., "Full and Partial Agonism of a Designed Enzyme Switch" ACS Synth. Biol. (2016) 5 (12):1475-1484.

Khersonsky and Fleishman (2017) Incorporating an allosteric regulatory site in an antibody through backbone design-supplementary information, *Protein Science* 26(4), p. 2-24.

* cited by examiner

Light Chain Variable domain multiple sequence alignment

```
4D5Flu         DIKDIQMTQSPSSLSASVGDRVTITCRASQSLVHSQGNTYLRWIQQKPGKAPKVLIYKVSNRFSGVPSRFSGSGSGTDFTLTISSLQPEDFATYYCQQSTHVPWT % GQGTKVELKRA
8B10           ----DIVLTQSPASLAVSLGQRATISCRASESV-DSIGISPMHWIQQKPGQPPKLLIYRASNLESGIPARFSGSGSRTDFTLTIIPVEADDVATYYCQQSNEDPRT % GGGTKVELKRA
Adalimumab     ----DIQMTQSPSSLSASVGDRVTITCRASQGI------RNYLAWIQQKPGKAPKLLIYAASTLQSGVPSRFSGSGSGTDFTLTISSLQPEDVATYYCQRINRAPYT % GQGTKVEIK---
Atezolizumab   ----DIQMTQSPSSLSASVGDRVTITCRASQDV------STAVAWYQQKPGKAPKLLIYSASFLYSGVPSRFSGSGSGTDFTLTISSLQPEDFATYYCQQYLHPAT % GQGTKVEIK---
Ipilimumab     ----EIVLTQSPGTLSLSPGERATLSCRASQSV------GSSYLAWYQQKPGQAPRLLIYGAFSRATGIPDRFSGSGSGTDFTLTIISRLEPEDFAVYYCQQYGSSPWT % GQGTKVEIK---
Nivolumab      ----EIVLTQSPATLSLSPGERATLSCRASQSV------SSYLAWYQQKPGQAFRLLIYDASNRATGIPARFSGSGSGTDFTLTISSLEPEDFAVYYCQQSSNWPRT % GQGTKVEIK---
```

Heavy Chain Variable domain multiple sequence alignment

```
4D5Flu         EVQLVESGGGLVQPGGSLRLSCAASGFTFSDYWMNW % RQAPGKGLEWVAQIRNKPYNYETYYADSVKGRFTISRDTSKNTVYLQMNSLRAEDTAVYYCTGSY------YGMDY % GQGTLVTVSS
8B10           EVQLLESGPELVKPGTSVKMSCKASGYTFTDYYMHW % KQSHGKSLEWIGLIN---PNNGGMGINQKFKGKATLTVDKSSSTAIMELRSLTSEDSAVYYCARRGGYGSRGYFDV % GAGTVTVSS
Adalimumab     EVQLVESGGGLVQPGRSLRLSCAASGFTFDDYAMHW % RQAPGKGLEWVSAIT---WNSGHIDYADSVEGRFTISRDNAKNSLYLQMNSLRAEDTAVYYCAKVSYLSTASSLDY % GQGTLVTVSS
Atezolizumab   EVQLVESGGGLVQPGGSLRLSCAASGFTFSDSWIHW % RQAPGKGLEWVAWIS---PYGGSTYYADSVKGRFTISADTSKNTAYLQMNSLRAEDTAVYYCARRHWP----GGFDY % GQGTLVTVSS
Ipilimumab     QVQLVESGGGVVQPGRSLRLSCAASGFTFSSYTMHW % RQAPGKGLEWVTFIS---YDGNNKYYADSVKGRFTISRDNSKNTLYLQMNSLRAEDTAIYYCARTGWL----GPFDY % GQGTLVTVSS
Nivolumab      QVQLVESGGGVVQPGRSLRLDCKASGITFSNSGMHW % RQAPGKGLEWVAVIW---YDGSKRYYADSVKGRFTISRDNSKNTLFLQMNSLRAEDTAVYYCATN---------DDY % GQGTLVTVSS
```

FIG. 4E

Ipilimumab (anti-CTLA-4) WT

V$_L$ from Ipilimumab

EIVLTQSPGTLSLSPGERATLSCRASQSVGSSYLAWYQQKPGQAPRLLIYGAFSRATGIPDRFSGSGSGTDFTLTISRLEPEDFAVYYCQQYGSSPWTFGQGTKVEIKR

V$_H$ from Ipilimumab

QVQLVESGGGVVQPGRSLRLSCAASGFTFSSYTMHWVRQAPGKGLEWVTFISYDGNNKYYADSVKGRFTISRDNSKNTLYLQMNSLRAEDTAIYYCARTGWLGPFDYWGQGTLVTVSS

F—98→G
V—37→A
W—110→G

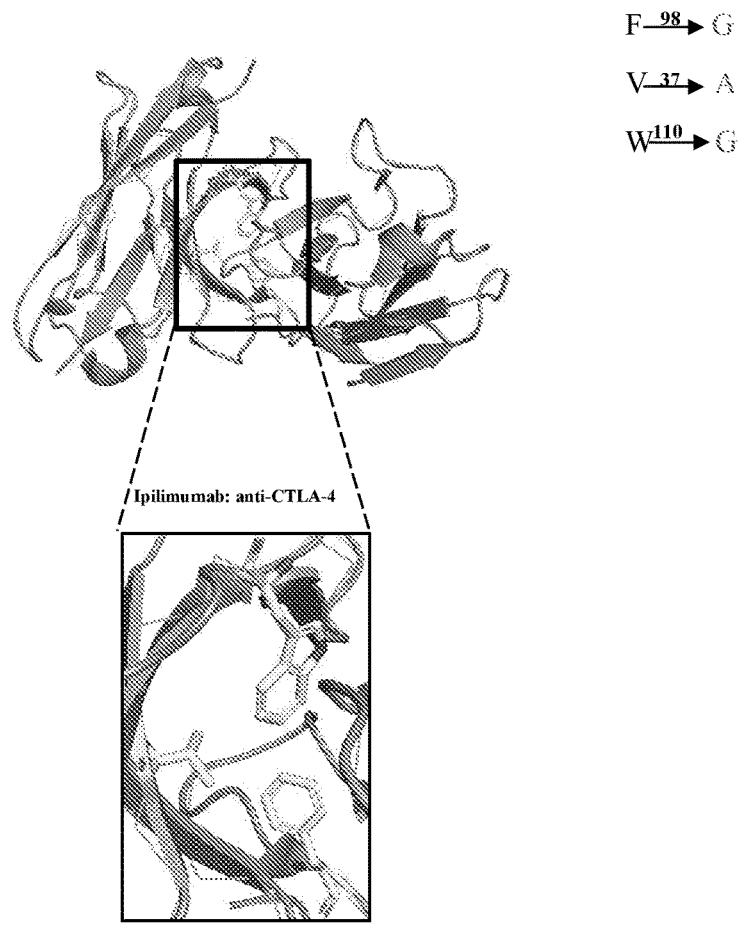

Ipilimumab: anti-CTLA-4

```
3GSWT    EIVLTQSPGTLSLSPGERATLSCRASQSVGSSYLAWYQQKPGQAPRLLIYGAFSRATGIP
3GSWT    DRFSGSGSGTDFTLTISRLEPEDFAVYYCQQYGSSPWTFGQGTKVEIKR
3GSWT            QVQLVESGGGVVQPGRSLRLSCAASGFTFSSYTMHWVRQAPGKGLEWVTFIS
3GSWT    YDGNNKYYADSVKGRFTISRDNSKNTLYLQMNSLRAEDTAIYYCARTGWLGPFDYWGQGT
3GSWT    LVTVSS   246

5GSWT    EIVLTQSPGTLSLSPGERATLSCRASQSVGSSYLAWYQQKPGQAPRLLIYGAFSRATGIP
5GSWT    DRFSGSGSGTDFTLTISRLEPEDFAVYYCQQYGSSPWTFGQGTKVEIKR
5GSWT                        QVQLVESGGGVVQPGRSLRLSCAASGFTFSSYTMHWVRQA
5GSWT    PGKGLEWVTFISYDGNNKYYADSVKGRFTISRDNSKNTLYLQMNSLRAEDTAIYYCARTG
5GSWT    WLGPFDYWGQGTLVTVSS    258
```

FIG. 6A

COMPOSITIONS AND METHODS FOR MODULATION OF ANTIBODY ACTIVITY

This application is a § 371 application of PCT/US2020/030354, filed Apr. 29, 2020, which claims priority under 35 U.S.C. § 119 (e) to U.S. Provisional Patent Application No. 62/840,465, filed on Apr. 30, 2019. The foregoing applications are incorporated by reference herein.

Incorporated herein by reference in its entirety is the Sequence Listing being concurrently submitted via EFS-Web as an ASCII text file named SEQLIST.txt, created Sep. 29, 2021, and having a size of 26,126 bytes.

FIELD OF THE INVENTION

The present invention relates to the field of immunology. More specifically, the invention provides compositions and methods for modulating antibody activity.

BACKGROUND OF THE INVENTION

Several publications and patent documents are cited throughout the specification in order to describe the state of the art to which this invention pertains. Each of these citations is incorporated herein by reference as though set forth in full.

Antibody-derived therapeutics have proved to be very effective in several disease conditions where conventional therapies have failed and several therapeutic antibodies have gained clinical use for major diseases including various cancers, chronic inflammatory diseases, autoimmune diseases, and infection. However, since therapeutic antibodies are typically administered in the blood circulation in large doses and target molecules that have additional functions unrelated to the disease, such systemic inhibition of the target can produce undesirable side effects. For example, patients receiving rituximab therapy for B-cell lymphoma have increased frequency of bacterial infections (Ram, et al. (2009) Leukemia Lymphoma 50(7):1083-95). Similarly, antibody-mediated targeting of tumor necrosis factor (TNF) (e.g., with adalimumab, infliximab, golimumab, or certolizumab), which is implicated in conditions such as rheumatoid arthritis, Crohn's disease, and ankylosing spondylitis, often escalates susceptibility to opportunistic pathogens and reactivation of previously acquired infections such as *Mycobacterium tuberculosis* (Zelova, et al. (2013) Inflamm. Res., 62:641-51; Siebert, et al. (2015) Pharmacol. Rev., 67:280-309; Selmi, et al. (2014) Immunol Res., 60:277-88; Murdaca, et al. (2015) Expert Opin. Drug Saf., 14:571-82; Wallis, R. S. (2009) Curr. Opin. Infect. Dis., 22(4):403-9; Martin-Mola, et al. (2009) Rheum. Dis. Clin. North Am., 35(1):183-99). Additionally, while therapeutic antibodies against immune checkpoints—such as inhibitors of cytotoxic T-lymphocyte-associated protein 4 (CTLA-4), programmed cell death protein 1 (PD-1), and programmed death-ligand 1 (PD-L1)—have shown promising early indications, they are also associated with severe, and sometimes fatal, adverse side effects, largely due to the non-specific activation of T-cells (Winer, et al. (2018) J. Thorac. Dis., 10:S480-S489; Myers, et al. (2018) Curr. Oncol., 25:342-347; Johnson, et al. (2015) Ther. Adv. Med. Oncol., 7:97-106; Cappelli, et al. (2017) Rheum. Dis. Clin. North. Am., 43:65-78; Topalian, et al. (2015) Cancer Cell 27:450-461). Clearly, improved control of the activity of therapeutics antibodies, thereby reducing unwanted side effects, are needed.

SUMMARY OF THE INVENTION

Figure 2A:
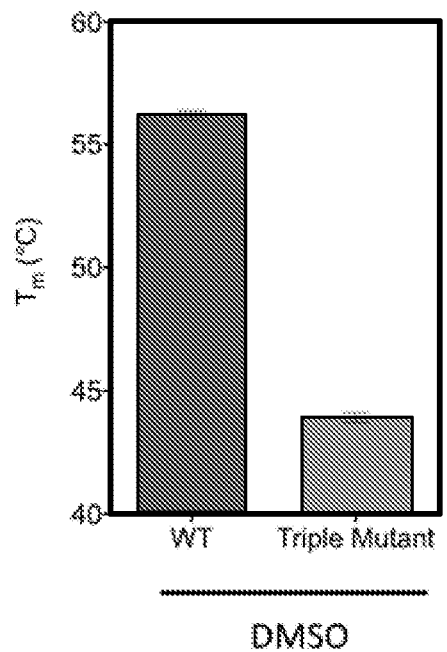
Figure 2B:
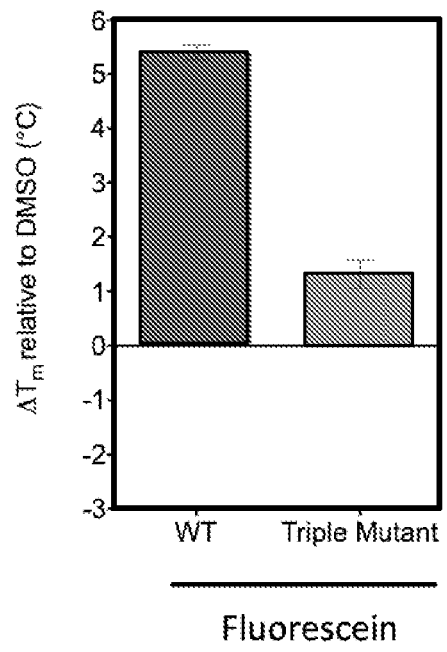
Figure 2C:
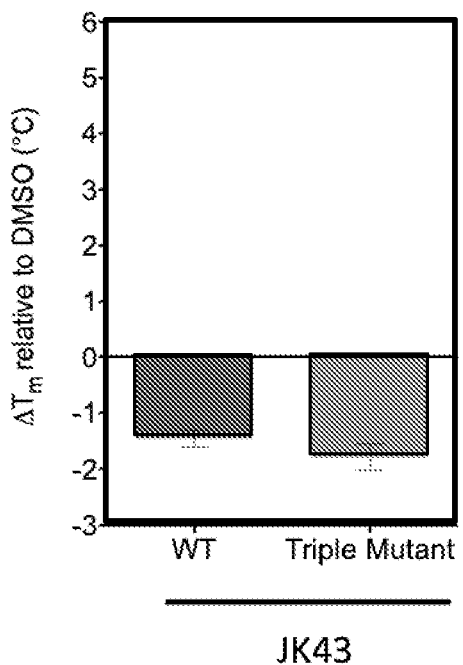
Figure 2D:
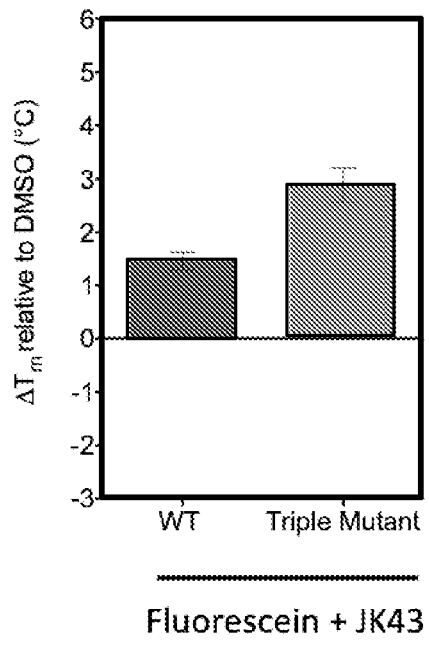

In accordance with the present invention, allosteric antibodies are provided. The allosteric antibodies of the instant invention comprise at least two amino acid substitutions in an antigen-binding antibody which form a contiguous cavity within the allosteric antibody. The allosteric antibody has reduced or lacks binding affinity for antigen compared to the unmutated antigen-binding antibody. The binding of an effector molecule to the cavity within the allosteric antibody increases or restores antigen binding of the allosteric antibody (e.g., compared to in the absence of the effector molecule). In a particular embodiment, the amino acid substitutions result in the removal of at least 12 heavy atoms from the antigen-binding antibody. In a particular embodiment, at least one of amino acid substitutions is the substitution of a phenylalanine, tyrosine, or tryptophan. In a particular embodiment, at least one amino acid substitution is on the heavy chain of the antigen-binding antibody and at least one amino acid substitution is on the light chain of the antigen-binding antibody. In a particular embodiment, the amino acid substitutions comprise the substitution of an amino acid with glycine. In a particular embodiment, the allosteric antibody comprises a Trp110Gly substitution in the heavy chain and a Phe98Gly substitution in the light chain, or corresponding amino acid changes. In a particular embodiment, the allosteric antibody comprises Trp110Gly and Val37Ala substitutions in the heavy chain and a Phe98Gly substitution in its light chain, or corresponding amino acid changes. The allosteric antibodies can bind any antigen. The allosteric antibodies can be a full-length antibody (e.g., a monoclonal antibody) or an antibody fragment (e.g., an scFv or Fab fragment). Compositions comprising the allosteric antibody and a carrier are also encompassed by the instant invention.

In accordance with another aspect of the instant invention, methods of modulating the activity of an allosteric antibody are provided, particularly in the context of therapeutic treatment of a subject. Generally, the method comprises contacting the allosteric antibody with an effector molecule, thereby restoring and/or increasing the antigen-binding activity of the allosteric antibody. In a particular embodiment, the method comprises administering the allosteric antibody to a subject in need thereof and administering an effector molecule at the desired time and location for activity of the allosteric antibody. In a particular embodiment, the allosteric antibody is administered systemically or intravenously to the subject and the effector molecule is delivered to the site of desired activity such as by direct injection or transdermally.

BRIEF DESCRIPTION OF THE DRAWINGS

FIG. 1A provides a graph of the quenching of fluorescein fluorescence by wild-type (WT) 4D5Flu or the triple mutant and the addition of 10 or 100 μM JK43. FIG. 1B provides a graph of fluorescein fluorescence quenching of the triple mutant over a range of dose of JK43. The $EC_{50}$ is 16 μM. FIG. 1C provides a graph of fluorescein fluorescence quenching of WT or triple mutant titrations in the presence or absence of 100 μM JK43. All data are presented as mean±SEM, n=8. Error bars are included but are often too small to be visible. For WT, the $EC_{50}$ values are 75-80 nM, regardless of the presence of JK43. For triple mutant, the $EC_{50}$ value is 208 nM in the presence of 100 μM JK43, and 780 nM in the absence of JK43.

FIG. 2A shows the apparent thermal unfolding temperature as measured via differential scanning fluorimetry for WT 4D5Flu and for the triple mutant. FIG. 2B shows the apparent thermal unfolding temperature WT and the triple mutant upon addition of 5 µM fluorescein. FIG. 2C shows the apparent thermal unfolding temperature WT and the triple mutant upon addition of 100 µM JK43. FIG. 2D shows the apparent thermal unfolding temperature WT and the triple mutant upon the addition of both fluorescein and JK43. All data are presented as mean±SEM, n=8.

Figure 3:
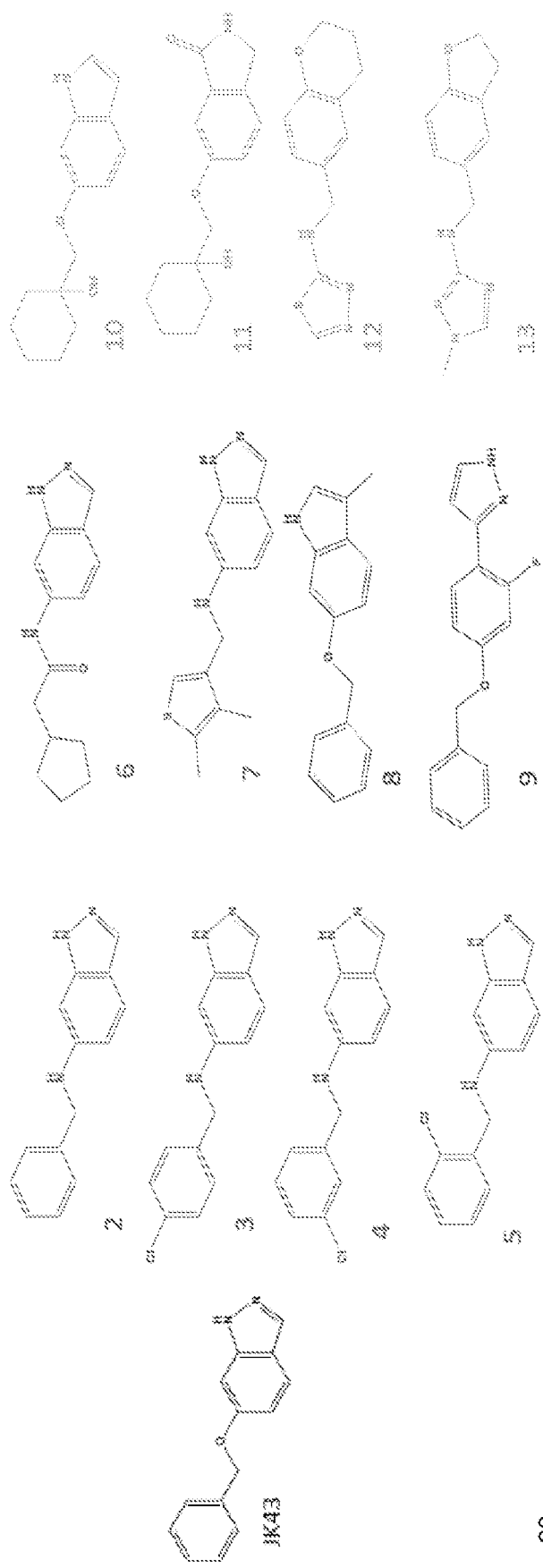
Figure 3:
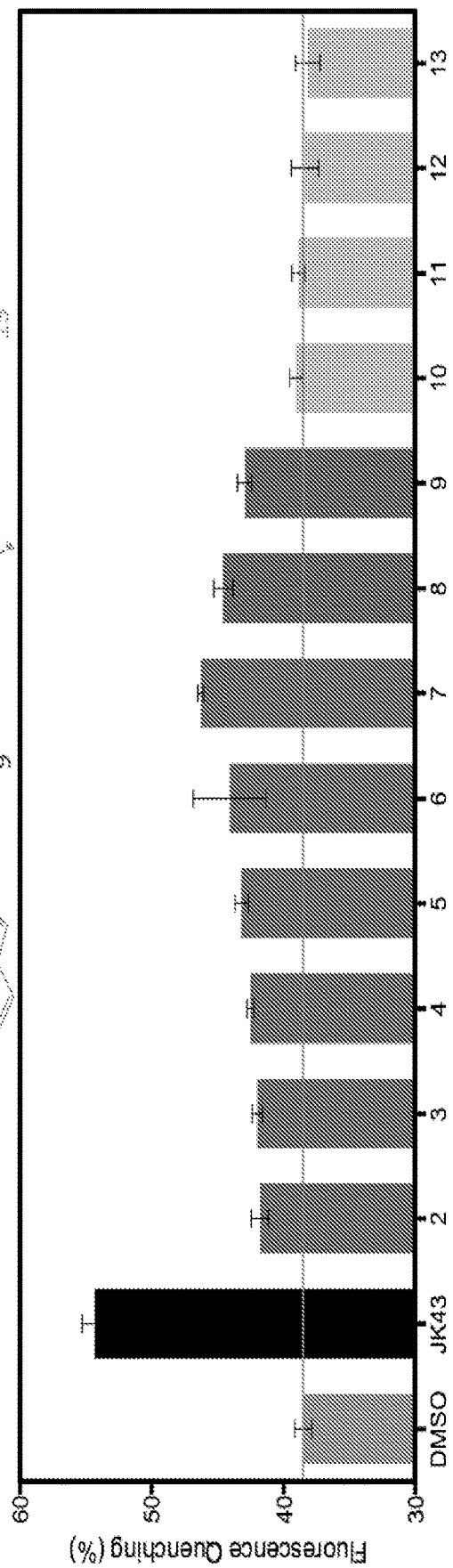

FIG. 3 provides the chemical structure of JK43 (6-phenylmethoxy-1H-indazole) and several analogs. The fluorescein fluorescence quenching of the triple mutant is shown in the presence of 10 µM of JK43 or the indicated analog. All data are presented as mean±SEM, n=8.

Figures 4A, 4B:
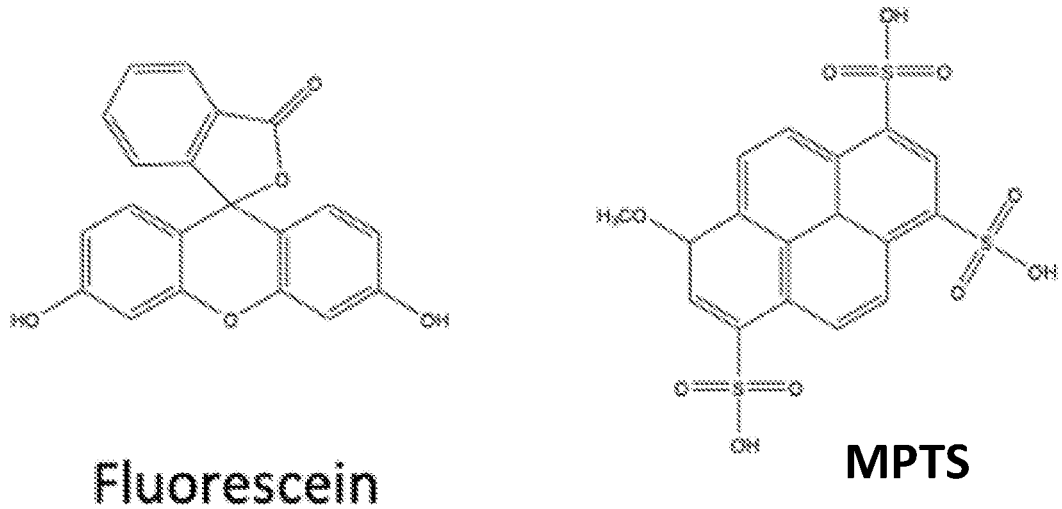
Figure 4C:
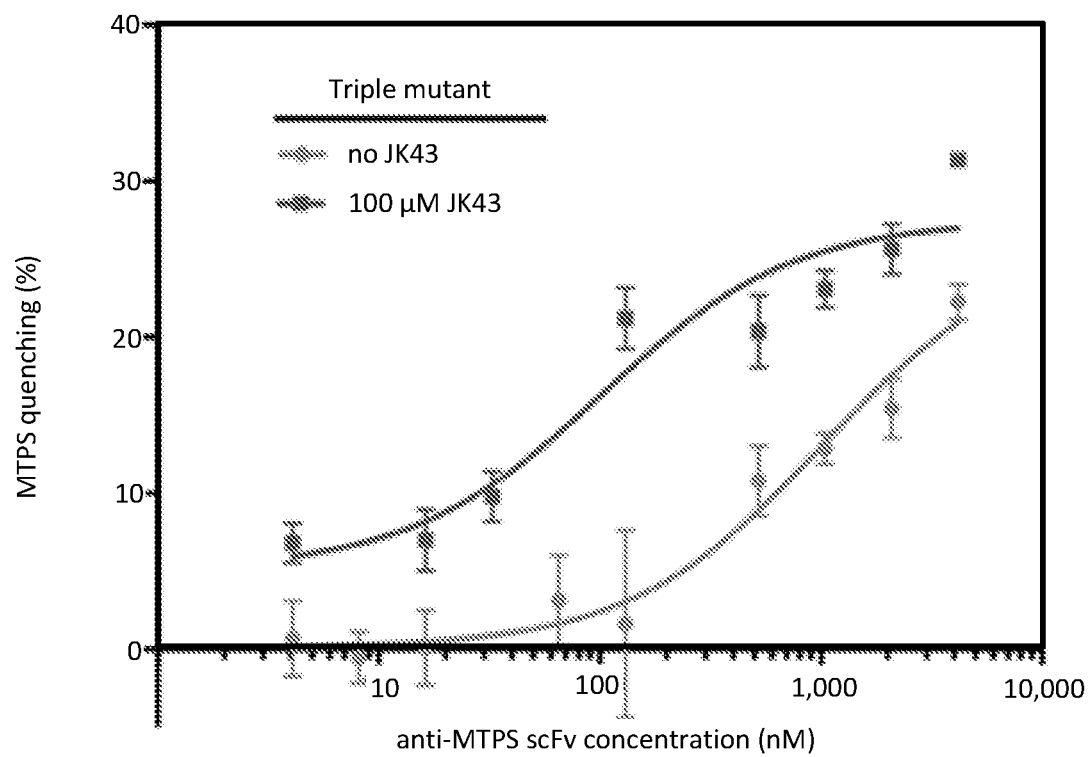
Figure 4D:
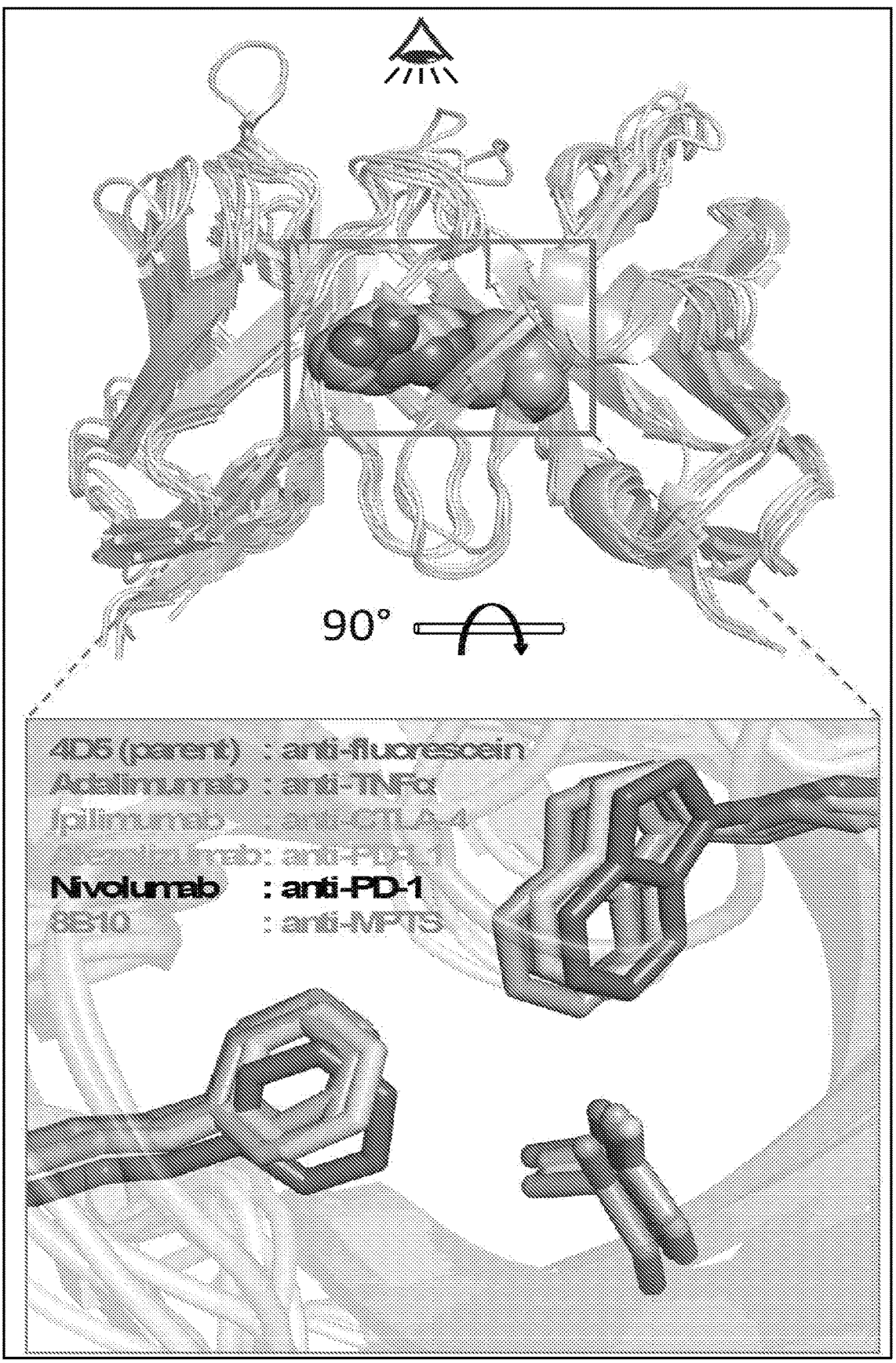

FIG. 4A provides the chemical structures of the two antigens of the characterized scFv's, fluorescein and MPTS. FIG. 4B provides an amino acid sequence alignment of 4D5Flu (SEQ ID NO: 4) and the scFv-formatted 8B10 (SEQ ID NO: 5). The three residues that comprise the conserved constellation are highlighted with boxes and the synthetic serine/glycine linker is also highlighted in boxes. FIG. 4C provides a graph of MPTS fluorescence quenching by the anti-MPTS triple mutant in the presence or absence of 100 µM JK43. In the absence of JK43, the anti-MPTS triple mutant quenches MPTS with $EC_{50}$ 1.0 µM. Upon addition of 100 µM JK43 the $EC_{50}$ is improved ten-fold, to 0.1 µM. All data are presented as mean±SEM, n=8. FIG. 4D shows that the triple mutant constellation is structurally conserved. Despite their overall sequence divergence in the framework region, all five representative antibodies shown (Adalimumab (anti-TNF-α), Ipilimumab (anti-CTLA-4), Atezolizumab (anti-PD-L1), Nivolumab (anti-PD-1), and 8B10 (anti-MPTS)) share the precise arrangement of these three sidechains found in 4D5. FIG. 4E provides a sequence alignment of the light chain variable domains (SEQ ID NOs: 8-13 from top to bottom) and heavy chain variable domains (SEQ ID NOs: 14-19 from top to bottom) of 4D5Flu, adalimumab, ipilimumab, atezolizumab, nivolumab, and 8B10.

Figure 5:
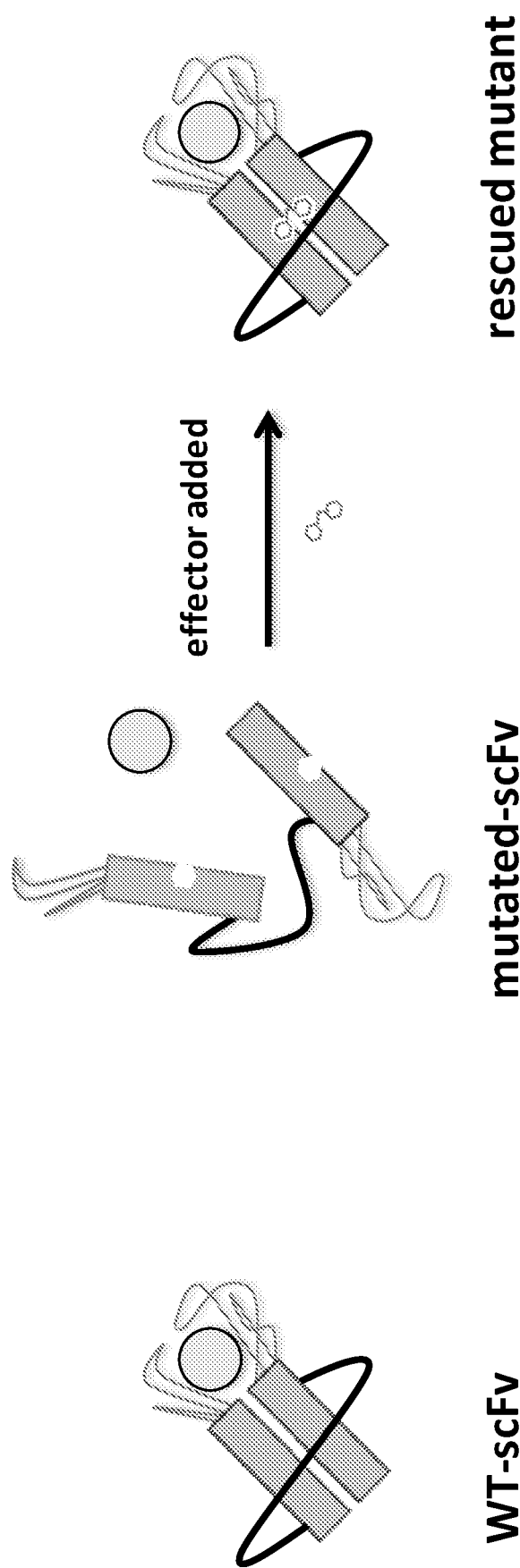

FIG. 5 provides a schematic of an scFv and a mutated scFv which is rescued upon addition of the effector molecule.

Figure 6B:
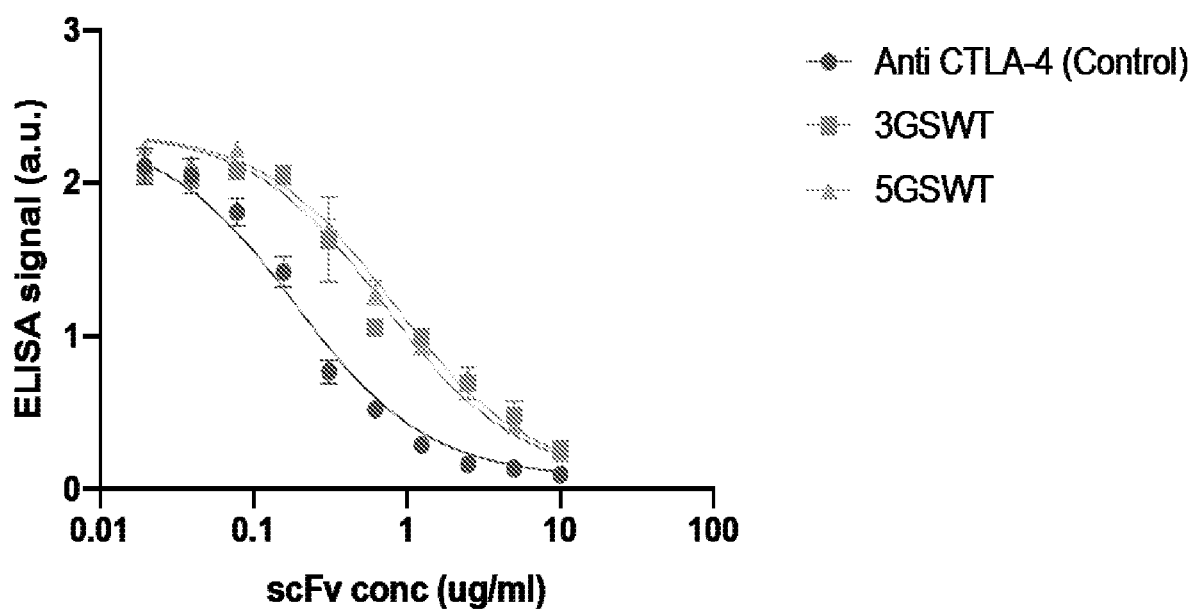

FIG. 6A provides the amino acid sequences of the light chain variable domain (SEQ ID NO: 20) and the heavy chain variable domain (SEQ ID NO: 21) of ipilimumab, wherein the amino acids which correspond to $V_L$F98, $V_H$V37, and $V_H$W110 in 4D5Flu are underlined. FIG. 6A also provides a schematic of the three dimensional structure of these amino acids and the amino acid sequences of two anti-CTLA-4 scFv constructs (3GSWT (SEQ ID NO: 22) and 5GSWT (SEQ ID NO: 23)) generated based on ipilimumab, wherein the linker for 3GSWT is VL-GG(GGSGG)$_3$ GG-VH (SEQ ID NO: 6) and the linker for 5GSWT is VL-GG (GGSGG)$_5$ GG-VH (SEQ ID NO: 7). FIG. 6B provides a graph of the affinity of ipilimumab and two different scFv constructs based on ipilimumab (3GSWT and 5GSWT) for CTLA-4.

Figure 7:
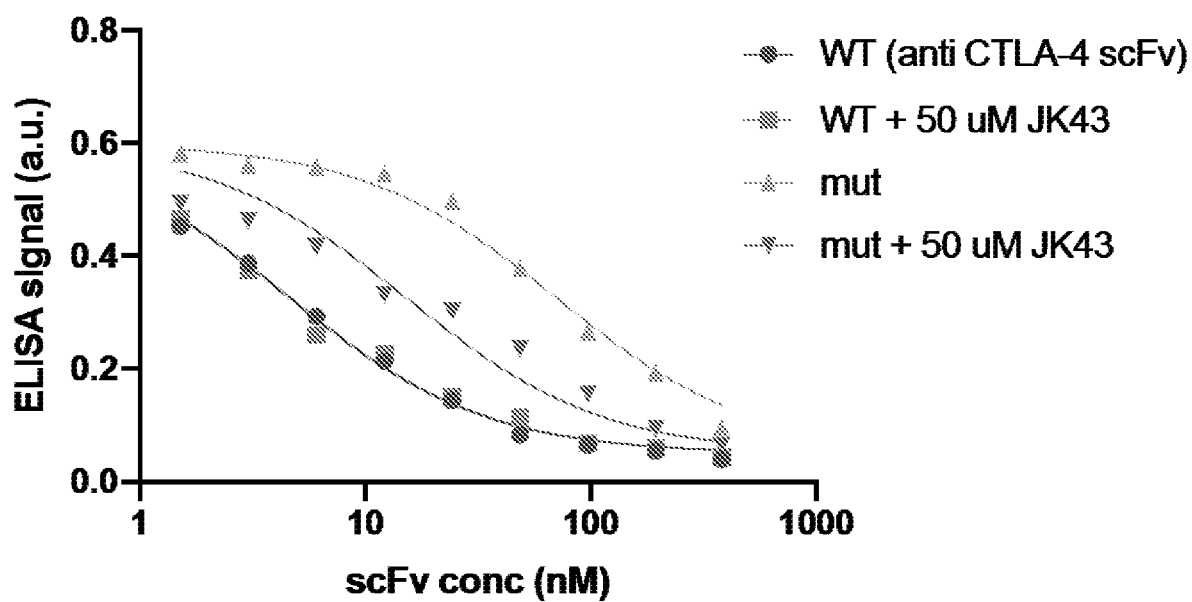

FIG. 7 provides a graph of the affinity of 5GSWT (a wild-type scFv construct based on ipilimumab) and the triple mutant version of 5GSWT (mut) for CTLA-4 in the presence or absence of JK43 (50 µM).

Figure 8:
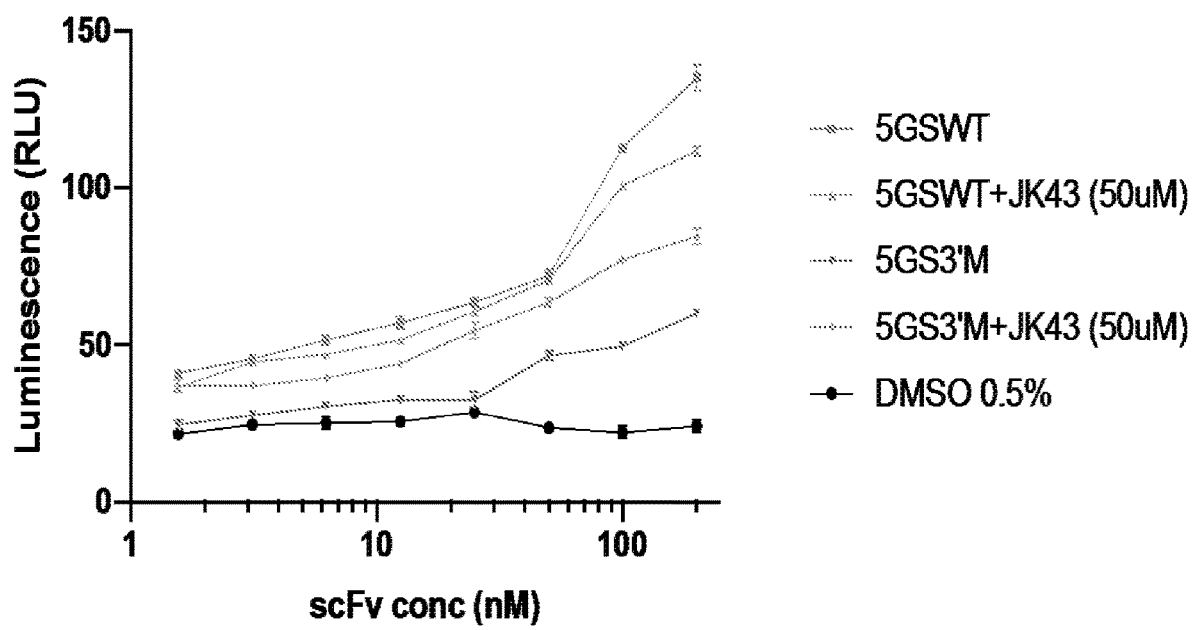

FIG. 8 provides a graph of the ability of 5GSWT and the triple mutant version (5GS3'M) to block CTLA-4 in a cellular context in the presence or absence of JK43 (50 µM). Vehicle alone (DMSO) is not neutralizing.

DETAILED DESCRIPTION OF THE INVENTION

The use of chemical biology to modulate protein activity is a powerful strategy that can be used to engineer small molecule-dependent protein activity into specific proteins of interest. By tethering protein activity to the presence of a small molecule, one can switch "on and off" the protein using those small molecules. This scheme, if applied to therapeutic antibodies, can reduce adverse side effects caused by activity of checkpoint inhibitors outside the tumor microenvironment. By re-engineering an allosteric site into therapeutic antibodies, the antibody can be produced in an "off state" by default, such that administering of this inactive form of the antibody would not trigger an immune response. Upon introduction of the activating small molecule into the intended (e.g., tumor) site, the antibody will be activated and elicit toxicity only in the proximity of the injection site. FIG. 5 provides a schematic of the allosteric antibody in the context of an scFv fragment.

Internal cavities formed from mutations can be filled by the binding of hydrophobic small molecules, thereby restoring protein activity (Matthews, et al. (2009) Protein Sci., 18:494-502; Xia, et al. (2013) J. Am. Chem. Soc., 135: 18840-18849; Deckert, et al. (2012) J. Am. Chem. Soc., 134:10055-10060; Budiardjo, et al. (2016) ACS Synth. Biol., 5:1475-1484). Specifically, structurally-critical residues can be substituted with a smaller residue in its place, thereby destabilizing the protein. The mutation can then be complemented with an exogenous small molecule that binds selectively and non-covalently to the pocket created by the mutation, such as by mimicking the original sidechain that was removed upon mutation, thereby restoring protein activity. To improve the binding affinity of the exogenous small molecule (activating ligand), it is desirable to use a small molecule with higher molecular weight than just the side chain of an amino acid (e.g., indole). Thus, the instant invention employs multiple cavity-forming mutations (e.g., 2, 3, or more mutations) instead of just one, particularly at least one adjacent or complementary to the first mutation.

In accordance with the instant invention, allosteric antibodies are provided. In a particular embodiment, the allosteric antibody comprises at least two amino acid mutations (e.g., substitutions). In a particular embodiment, the allosteric antibody cannot bind or has diminished binding affinity (e.g., at least about 10 fold lower, at least about 50 fold lower, at least about 100 fold lower or more) for its antigen than the wild-type/unmutated antibody. The binding affinity of the allosteric antibody is increased (e.g., at least about 2 fold, at least about 5 fold, at least about 10 fold, at least about 20 fold, at least about 50 fold, at least about 100 fold or more) or restored (e.g., to near or at wild-type levels) by binding of an effector molecule. The use of the effector molecule allows for spatial and/or temporal control of the activity (e.g., antigen binding) of the antibody.

The allosteric antibodies of the instant invention may have one, two, three, four, five or, particularly, all six of the following characteristics. First, the amino acid mutations form a space or cavity within the allosteric antibody (i.e., the mutated sidechains must be in close proximity (in three-dimensional space) to one other, so that the resulting cavity will be contiguous). Second, the amino acid mutations result in the removal of at least 12 heavy atoms (e.g., non-hydrogen atoms) from the antibody. Third, at least one of the mutated amino acids comprises an aromatic side chain (e.g., at least of the mutated/substituted amino acids is phenylalanine, tyrosine, or tryptophan). Fourth, the mutated residues are located at an interface between two domains or chains of the antibody (e.g., between the two domains of an scFv or between the heavy chain and light chain of an antibody). Fifth, the amino acid mutations are not within the complementarity determining regions (CDRs) of the antibody. Sixth, the amino acid mutations are within the variable regions (e.g., within the framework regions of the variable regions).

In a particular embodiment, the allosteric antibody of the instant invention comprises the amino acid substitutions of at least two amino acids with glycine and/or alanine, particularly glycine. In a particular embodiment, the allosteric antibody comprises a Trp110Gly substitution in the heavy chain and a Phe98Gly substitution in its light chain (e.g., based on amino acid positioning in the 4D5Flu antibody). In a particular embodiment, the allosteric antibody comprises a Trp110Gly substitution in the heavy chain and a Tyr36Gly substitution in its light chain (e.g., based on amino acid positioning in the 4D5Flu antibody). In a particular embodiment, the allosteric antibody comprises a Trp110Gly substitution and a Val37Ala substitution in the heavy chain and a Phe98Gly substitution in its light chain (e.g., based on amino acid positioning in the 4D5Flu antibody). In a particular embodiment, the allosteric antibody comprises a Trp110Gly substitution and a Tyr95Ala substitution in the heavy chain and a Phe98Ala substitution in its light chain (e.g., based on amino acid positioning in the 4D5Flu antibody). In a particular embodiment, the allosteric antibody comprises a Trp47Ala substitution and a Val37Ala substitution in the heavy chain and a Phe98Gly substitution in its light chain (e.g., based on amino acid positioning in the 4D5Flu antibody). The instant invention also encompasses allosteric antibodies wherein any or all glycine substitution is replaced with an alanine substitution and/or any or all alanine substitutions are replaced with a glycine substitution. For example, the instant invention encompasses an allosteric antibody wherein Trp110 and Val37 in the heavy chain and Phe98 in its light chain (e.g., based on amino acid positioning in the 4D5Flu antibody) are each independently substituted with either an alanine or a glycine. As noted, the above amino acid positions are based on the positioning in the 4D5Flu antibody (sequential numbering). With regard to IMGT numbering, the amino acids are $V_L$ F118, $V_H$ V42, and $V_H$ W118. With regard to Chothia numbering, the amino acids are $V_L$ F98, $V_H$ V37, and $V_H$ W103. Accordingly, the instant invention also encompasses allosteric antibodies wherein the amino acid positions are defined by these numbering systems (e.g., IMGT: $V_L$ F118G, $V_H$ V42A, and $V_H$ W118G; Chothia: $V_L$ F98G, $V_H$ V37A, and $V_H$ W103G).

The amino acid numbering (provided above in the 4D5Flu antibody) may vary in different antibodies. As such, the corresponding amino acid may be substituted (e.g., the same amino acid but at a different numbered position having the same general three-dimensional location within the antibody). As described hereinbelow in the Example, the skilled artisan can determine the location of the amino acids to be substituted through an alignment of the amino acid sequences and/or three-dimensional modeling of the amino acids locations within the antibody. For example, FIG. 4E provides a sequence alignment of the light chain variable domains and heavy chain variable domains of 4D5Flu, adalimumab, ipilimumab, atezolizumab, nivolumab, and 8B10 which readily identifies the amino acids in adalimumab, ipilimumab, atezolizumab, nivolumab, and 8B10 which correspond to $V_L$F98, $V_H$V37, and $V_H$W110 in 4D5Flu. In a particular embodiment, the $V_L$F98 or corresponding amino acid is contained within the sequence PX$_1$TFGX$_2$G (SEQ ID NO: 24, particularly wherein X$_1$ is W, R, Y, or A and/or X$_2$ is G or Q). In a particular embodiment, the $V_H$V37 or corresponding amino acid is contained within the sequence X$_1$X$_2$WVX$_3$QX$_4$ (SEQ ID NO: 25, particularly wherein X$_1$ is M or I; X$_2$ is H or N; X$_3$ is R or K; and/or X$_4$ is S or A). In a particular embodiment, the $V_H$W110 or corresponding amino acid is contained within the sequence X$_1$DX$_2$WGX$_3$G (SEQ ID NO: 26, particularly wherein X$_1$ is M, F, L, or D; X$_2$ is Y or V; and/or X$_3$ is Q or A). In a particular embodiment, SEQ ID NOs: 24, 25, and/or 26 may comprise one, two, three, or more substitutions, particularly a conservative amino acid substitution(s). The corresponding amino acids may also be confirmed by three-dimensional modeling.

The allosteric antibodies of the instant invention can be a full-length antibody (e.g., IgG antibody) or a fragment thereof, particularly an antigen binding fragment thereof. The allosteric antibody may be a monoclonal antibody. The antibody may be a naturally occurring antibody or may be a synthetic or modified antibody (e.g., a recombinantly generated antibody; a chimeric antibody; a bispecific antibody; a humanized antibody; a camelid antibody; and the like). The antibody may comprise at least one purification tag. In a particular embodiment, the allosteric antibody is an antibody fragment. Antibody fragments include, without limitation, immunoglobulin fragments including, without limitation: Fab, Fab', F(ab')2, and F(v); and fusions (e.g., via a linker) of these immunoglobulin fragments including, without limitation: scFv, scFv$_2$, scFv-Fc, minibody, diabody, triabody, and tetrabody. The antibody may also be a protein (e.g., a fusion protein) comprising at least one antibody or antibody fragment. In a particular embodiment, the allosteric antibody is or comprises a Fab fragment. In a particular embodiment, the allosteric antibody is or comprises an scFv.

The antibody molecules of the invention may be prepared using a variety of methods known in the art. Polyclonal and monoclonal antibodies may be prepared, for example, as described in Current Protocols in Molecular Biology, Ausubel et al. eds. Antibodies may be prepared by chemical cross-linking, hybrid hybridoma techniques and by expression of recombinant antibody fragments expressed in host cells, such as bacteria or yeast cells. In one embodiment of the invention, the antibody molecules are produced by expression of recombinant antibody or antibody fragments in host cells. The nucleic acid molecules encoding the antibody may be inserted into expression vectors and introduced into host cells. The resulting antibody molecules are then isolated and purified from the expression system. The antibodies optionally comprise a purification tag by which the antibody can be purified.

The purity of the antibody molecules of the invention may be assessed using standard methods known to those of skill in the art, including, but not limited to, ELISA, immunohistochemistry, ion-exchange chromatography, affinity chromatography, immobilized metal affinity chromatography (IMAC), size exclusion chromatography, polyacrylamide gel electrophoresis (PAGE), western blotting, surface plasmon resonance and mass spectroscopy.

The allosteric antibodies of the instant invention can bind any antigen. For example, the allosteric antibody may be, without limitation, an anti-TNF-alpha antibody, an anti-VEGF-A antibody, or an antibody against an immune checkpoint (e.g., a checkpoint inhibitor). Immune checkpoints include, without limitation, cytotoxic T-lymphocyte-associated protein 4 (CTLA-4), programmed cell death protein 1 (PD-1), and programmed death-ligand 1 (PD-L1). In a particular embodiment, the allosteric antibody is based on (e.g., a mutation of) a therapeutic antibody. Examples of therapeutic antibodies are set forth below.

In a particular embodiment, the antibody to be mutated/substituted comprises amino acids $V_LF98$, $V_HV37$, and $V_HW110$ (based on amino acid positioning in the 4D5Flu antibody) or the same amino acids at corresponding positions within the antibody. In a particular embodiment, the resulting allosteric antibody comprises the triple mutation $V_LF98G/V_HV37A/V_HW110G$ or the corresponding amino acid substitutions of the same amino acids at the corresponding position in the antibody. Amino acids $V_LF98$, $V_HV37$, and $V_HW110$ (e.g., the constellation thereof in approximately the same positions as the 4D5Flu antibody) can be found in most antibodies. For example, therapeutic antibodies which include amino acids corresponding to $V_LF98$, $V_HV37$, and $V_HW110$ include, without limitation: abagovomab, abelacimab, abituzumab, abrilumab, actoxumab, adalimumab, aducanumab, afasevikumab, afutuzumab, alacizumab, alemtuzumab, alirocumab, amatuximab, amivantamab, andecaliximab, anetumab, anifrolumab, anrukinzumab, apamistamab, aprutumab, astegolimab, atezolizumab, atinumab, atoltivimab, avdoralimab, avelumab, avizakimab, azintuxizumab, balstilimab, bapineuzumab, bavituximab, bedinvetmab, befovacimab, begelomab, belantamab, belimumab, bemarituzumab, benralizumab, benufutamab, bermekimab, bersanlimab, bevacizumab, bezlotoxumab, bifikafusp, bimagrumab, bimekizumab, bintrafusp, blinatumomab, blontuvetmab, blosozumab, bococizumab, brazikumab, brentuximab, briakinumab, brodalumab, brolucizumab, brontictuzumab, budigalimab, burosumab, cabiralizumab, camidanlumab, camrelizumab, canakinumab, cantuzumab, carlumab, carotuximab, cemiplimab, cergutuzumab, certolizumab, cetrelimab, cetuximab, cibisatamab, cinpanemab, citatuzumab, cixutumumab, claudiximab, clazakizumab, clivatuzumab, cobolimab, codrituzumab, cofetuzumab, coltuximab, concizumab, cosibelimab, crenezumab, crizanlizumab, crotedumab, crovalimab, cusatuzumab, dacetuzumab, daclizumab, dapirolizumab, daratumumab, dectrekumab, demcizumab, denosumab, dezamizumab, dilpacimab, dinutuximab, diridavumab, disitamab, domagrozumab, donanemab, dostarlimab, drozitumab, duligotuzumab, dupilumab, durvalumab, dusigitumab, eculizumab, edrecolomab, efalizumab, efungumab, eldelumab, elezanumab, elgemtumab, elotuzumab, emactuzumab, emapalumab, emicizumab, emibetuzumab, enapotamab, enavatuzumab, encelimab, enfortumab, enoblituzumab, enokizumab, enoticumab, ensituximab, epcoritamab, epratuzumab, eptinezumab, erenumab, etaracizumab, etokimab, etrolizumab, evinacumab, evolocumab, faricimab, farletuzumab, fasinumab, fezakinumab, fianlimab, fibatuzumab, ficlatuzumab, figitumumab, firivumab, flanvotumab, fletikumab, flotetuzumab, fontolizumab, foralumab, foravirumab, fremanezumab, fresolimumab, frovocimab, frunevetmab, fulranumab, futuximab, galcanezumab, gancotamab, ganitumab, gantenerumab, garadacimab, gatipotuzumab, gatralimab, gedivumab, gemtuzumab, gilvetmab, girentuximab, glenzocimab, golimumab, gomiliximab, gosuranemab, gremubamab, guselkumab, ibalizumab, icrucumab, ieramilimab, ifabotuzumab, iladatuzumab, imalumab, imaprelimab, imgatuzumab, inclacumab, indatuximab, inebilizumab, infliximab, inotuzumab, intetumumab, ipilimumab, isatuximab, iscalimab, istiratumab, ivuxolimab, ixekizumab, labetuzumab, lacutamab, ladiratuzumab, lambrolizumab, lampalizumab, lanadelumab, landogrozumab, laprituximab, larcaviximab, lenvervimab, lenzilumab, leronlimab, lesofavumab, levilimab, lexatumumab, lifastuzumab, ligelizumab, lilotomab, lintuzumab, lirilumab, lodapolimab, lodelcizumab, lokivetmab, loncastuximab, lorukafusp, lorvotuzumab, lucatumumab, lumiliximab, lumretuzumab, lupartumab, lutikizumab, maftivimab, magrolimab, manelimab, margetuximab, marstacimab, matuzumab, mavezelimab, mavrilimumab, mepolizumab, mezagitamab, mirikizumab, mirvetuximab, mitazalimab, modotuximab, mogamulizumab, monalizumab, mosunetuzumab, moxetumomab, murlentamab, muromonab, namilumab, naptumomab, naratuximab, narnatumab, natalizumab, navivumab, navicixizumab, naxitamab, nemolizumab, nesvacumab, nidanilimab, nimacimab, nimotuzumab, nirsevimab, nivolumab, nurulimab, obexelimab, obiltoxaximab, obinutuzumab, ocaratuzumab, ocrelizumab, odesivimab, odronextamab, ofatumumab, oleclumab, olendalizumab, olinvacimab, olokizumab, omburtamab, onartuzumab, onfekafusp, ontamalimab, ontuxizumab, onvatilimab, opicinumab, oportuzumab, orilanolimab, orticumab, osocimab, otelixizumab, otilimab, otlertuzumab, oxelumab, ozanezumab, pabinafusp, pacmilimab, pamrevlumab, pankomab, panobacumab, parsatuzumab, pasotuxizumab, pateclizumab, pembrolizumab, pepinemab, perakizumab, pertuzumab, petosemtamab, pidilizumab, pinatuzumab, plamotamab, plozalizumab, pogalizumab, polatuzumab, ponezumab, porgaviximab, prasinezumab, prezalumab, pritoxaximab, prolgolimab, quetmolimab, quilizumab, racotumomab, radretumab, rafivirumab, ralpancizumab, ramucirumab, ranevetmab, ranibizumab, ravagalimab, ravulizumab, refanezumab, relfovetmab, remtolumab, retifanlimab, rituximab, rivabazumab, robatumumab, roledumab, rolinsatamab, romilkimab, romosozumab, rontalizumab, rosmantuzumab, rovalpituzumab, rozanolixizumab, rozipafusp, ruplizumab, sacituzumab, samalizumab, samrotamab, sapelizumab, sarilumab, sasanlimab, satralizumab, secukinumab, selicrelumab, semorinemab, seribantumab, setoxaximab, setrusumab, sifalimumab, simlukafusp, simtuzumab, sintilimab, sirtratumab, sirukumab, sofituzumab, solanezumab, solitomab, spartalizumab, spesolimab, suptavumab, sutimlimab, suvratoxumab, tabituximab, tadocizumab, tafasitamab, talquetamab, tamrintamab, tanibirumab, tarextumab, tebentafusp, telisotuzumab, temelimab, tenatumomab, teplizumab, tepoditamab, teprotumumab, tesidolumab, tezepelumab, ticilimumab, tigatuzumab, tilavonemab, tildrakizumab, tilvestamab, timigutuzumab, timolumab, tisotumab, tocilizumab, tomaralimab, tomuzotuximab, toripalimab, tosatoxumab, tralokinumab, trastuzumab, tremelimumab, trevogrumab, ublituximab, ulocuplumab, ustekinumab, utomilumab, vadastuximab, valanafusp, vanalimab, vandortuzumab, vantictumab, vanucizumab, varisacumab, varlilumab, vedolizumab, veltuzumab, vesencumab, vibecotamab, vibostolimab, visilizumab, vofatamab, volagidemab, vonlerolizumab, vopratelimab, vorsetuzumab, vunakizumab, xentuzumab, zagotenemab, zalifrelimab, zalutumumab, zampilimab, zanidatamab, zatuximab, zelminemab, zenocutuzumab, ziltivekimab, zolbetuximab, and zolimomab. In a particular embodiment, the therapeutic antibody is selected from the group consisting of: muromonab, abciximab, capromab, nofetumomab, daclizumab, rituximab, basiliximab, etanercept, infliximab, palivizumab, trastuzumab, arcitumomab, alemtuzumab, adalimumab, ibritumomab, alefacept, tositumomab, bevacizumab, cetuximab, omalizumab, abatacept, natalizumab, panitumumab, ranibizumab, eculizumab, certolizumab, rilonacept, ustekinumab, canakinumab, golimumab, ofatumumab, denosumab, tocilizumab, aflibercept, brentuximab, belatacept, belimumab, ipilimumab, pertuzumab, raxibacumab, obinutuzumab/afutuzumab, ado-trastuzumab, blinatumomab, nivolumab, pembrolizumab/lambrolizumab, ramucirumab, siltuximab, vedolizumab, alirocumab, daratumumab, dinutuximab, elotuzumab, evolocumab, idarucizumab, mepolizumab, necitumumab, secukinumab, atezolizumab, infliximab, ixekizumab, obiltoxaximab, and reslizumab. In a particular embodiment, the therapeutic antibody is adalimumab. In a particular embodiment, the therapeutic antibody is ipilimumab.

The allosteric antibodies of the instant invention may be further modified. For example, the allosteric antibodies may be humanized. In a particular embodiment, the antibodies (or a portion thereof) are inserted into the backbone of an antibody or antibody fragment construct. For example, the variable light domain and/or variable heavy domain of the antibodies of the instant invention may be inserted into another antibody construct. Methods for recombinantly producing antibodies are well-known in the art. Indeed, commercial vectors for certain antibody and antibody fragment constructs are available.

The antibodies of the instant invention may also be conjugated/linked to other components. For example, the antibodies may be operably linked (e.g., covalently linked, optionally, through a linker) to at least one detectable agent, imaging agent, contrast agent, immunosuppressant, or anti-inflammatory agent. The antibodies of the instant invention may also comprise at least one purification tag (e.g., a His-tag).

Compositions comprising the allosteric antibodies are also encompassed by the instant invention. In a particular embodiment, the composition comprises at least one allosteric antibody of the instant invention and at least one pharmaceutically acceptable carrier.

As explained hereinabove, the effector molecule of the instant invention binds the allosteric antibody and increases or restores the binding activity of the allosteric antibody. In a particular embodiment, the effector molecule is a small molecule. In a particular embodiment, the effector molecule fits or approximates the volume and electrostatics of the allosteric cavity. In a particular embodiment, the effector molecule comprises the amino acid side chains (or analog thereof) that were removed from the antibody by the mutations to make the allosteric antibody. For example, the effector molecule may comprise the removed amino acid side chains joined via a linker, particularly a short linker of about 1 to 5 atoms (e.g., a heteroatom or an alkyl optionally comprising one or more heteroatoms). In a particular embodiment, the effector molecule is a molecule provided in FIG. 3. In a particular embodiment, the effector molecule is JK43. In a particular embodiment, the effector molecule is an analog of a molecule provided in FIG. 3, particularly JK43. For example, JK43 may be substituted (e.g., on an aromatic ring), have a carbon atom replaced with a heteroatom (e.g., N, O, or S), and/or the linker may be altered (e.g., change in length or insertion or removal of heteroatom). Examples of substituents include, for example, halo (such as F, Cl, Br, I), lower alkyl (e.g., 1-3 carbons), haloalkyl (e.g., $CCl_3$ or $CF_3$), hydroxy, methoxy, carboxyl, oxo, epoxy, amino, carbamoyl (e.g., $NH_2C(\uparrow O)$—), urea (—$NHCONH_2$), ether, ester, thioester, nitrile, nitro, amide, carbonyl, carboxylate and thiol. In a particular embodiment, the effector molecule may be a prodrug. For example, the effector molecule may be inactive until to reaches a desired site where it is activated, for example, by chemical or enzymatic means.

Compositions comprising the effector molecules are also encompassed by the instant invention. In a particular embodiment, the composition comprises at least one effector molecule of the instant invention and at least one pharmaceutically acceptable carrier.

In accordance with another aspect of the instant invention, methods of modulating antibody activity are provided. The methods can be performed in vitro or in vivo. In a particular embodiment, the methods are used to inhibit (e.g., reduce or slow), treat, and/or prevent a disease or disorder in a subject are provided. Generally, the methods of the instant invention comprise administering to a subject or cell an allosteric antibody and effector molecule. In a particular embodiment, the allosteric antibody and effector molecule are contained in separate compositions comprising a pharmaceutically acceptable carrier. In a particular embodiment, the allosteric antibody and the effector molecule are administered at different times. In a particular embodiment, the allosteric antibody and the effector molecule are administered to different locations and/or by different means, particularly within a subject.

With regard to in vivo or therapeutic methods, the allosteric antibody (e.g., based on a therapeutic antibody) can be administered to the subject by any means. In a particular embodiment, the allosteric antibody is administered systemically. In a particular embodiment, the allosteric antibody is administered intravenously, intramuscularly, or subcutaneously. The effector molecule may be administered simultaneously and/or at different times (e.g., consecutively) than the allosteric antibody. Preferably, the effector molecule is administered at a different time and/or different location than the allosteric antibody. For example, in the context of treating cancer, the allosteric antibody may be administered systemically and the effector molecule may be administered locally (e.g., by direct injection to the or near the cancer or tumor), optionally at a later timepoint.

As stated hereinabove, compositions comprising an allosteric antibody and at least one carrier (e.g., a pharmaceutically acceptable carrier) and compositions comprising an effector molecule and at least one carrier (e.g., a pharmaceutically acceptable carrier) are encompassed by the instant invention. Except insofar as any conventional carrier is incompatible with the variant to be administered, its use in the pharmaceutical composition is contemplated. In a particular embodiment, the carrier is a pharmaceutically acceptable carrier for transdermal, intravenous, intramuscular, or subcutaneous administration. The instant invention also encompasses kits comprising a composition comprising an allosteric antibody and at least one carrier (e.g., a pharmaceutically acceptable carrier) and/or a composition comprising an effector molecule and at least one carrier (e.g., a pharmaceutically acceptable carrier).

As explained hereinabove, the compositions of the instant invention are useful for treating a disease or disorder. A therapeutically effective amount of the composition may be administered to a subject in need thereof. The dosages, methods, and times of administration are readily determinable by persons skilled in the art, given the teachings provided herein.

The components as described herein will generally be administered to a patient as a pharmaceutical preparation. The term "patient" or "subject" as used herein refers to human or animal subjects. The components of the instant invention may be employed therapeutically, under the guidance of a physician for the treatment of the indicated disease or disorder.

The pharmaceutical preparation comprising the components of the invention may be conveniently formulated for administration with an acceptable medium (e.g., pharmaceutically acceptable carrier) such as water, buffered saline, ethanol, polyol (for example, glycerol, propylene glycol, liquid polyethylene glycol and the like), dimethyl sulfoxide (DMSO), oils, detergents, suspending agents or suitable mixtures thereof. The concentration of the agents in the chosen medium may be varied and the medium may be chosen based on the desired route of administration of the pharmaceutical preparation. Except insofar as any conventional media or agent is incompatible with the agents to be administered, its use in the pharmaceutical preparation is contemplated.

The compositions of the present invention can be administered by any suitable route, for example, by injection (e.g., for local (direct) or systemic administration), oral, pulmonary, topical, nasal or other modes of administration. The composition may be administered by any suitable means, including parenteral, intramuscular, intravenous, intraarterial, intraperitoneal, subcutaneous, topical, inhalatory, transdermal, intrapulmonary, intraareterial, intrarectal, intramuscular, and intranasal administration. In a particular embodiment, the composition is administered directly to the blood stream (e.g., intravenously). In a particular embodiment, the composition is administered by direct injection. In general, the pharmaceutically acceptable carrier of the composition is selected from the group of diluents, preservatives, solubilizers, emulsifiers, adjuvants and/or carriers. The compositions can include diluents of various buffer content (e.g., Tris HCl, acetate, phosphate), pH and ionic strength; and additives such as detergents and solubilizing agents (e.g., polysorbate 80), antioxidants (e.g., ascorbic acid, sodium metabisulfite), preservatives (e.g., Thimersol, benzyl alcohol) and bulking substances (e.g., lactose, mannitol). The compositions can also be incorporated into particulate preparations of polymeric compounds such as polyesters, polyamino acids, hydrogels, polylactide/glycolide copolymers, ethylenevinylacetate copolymers, polylactic acid, polyglycolic acid, etc., or into liposomes. Such compositions may influence the physical state, stability, rate of in vivo release, and rate of in vivo clearance of components of a pharmaceutical composition of the present invention. See, e.g., Remington: The Science and Practice of Pharmacy, 21st edition, Philadelphia, PA. Lippincott Williams & Wilkins. The pharmaceutical composition of the present invention can be prepared, for example, in liquid form, or can be in dried powder form (e.g., lyophilized for later reconstitution).

As used herein, "pharmaceutically acceptable carrier" includes any and all solvents, dispersion media and the like which may be appropriate for the desired route of administration of the pharmaceutical preparation, as exemplified in the preceding paragraph. The use of such media for pharmaceutically active substances is known in the art. Except insofar as any conventional media or agent is incompatible with the molecules to be administered, its use in the pharmaceutical preparation is contemplated.

Pharmaceutical compositions containing a compound of the present invention as the active ingredient in intimate admixture with a pharmaceutical carrier can be prepared according to conventional pharmaceutical compounding techniques. The carrier may take a wide variety of forms depending on the form of preparation desired for administration, e.g., intravenous. Injectable suspensions may be prepared, in which case appropriate liquid carriers, suspending agents and the like may be employed. Pharmaceutical preparations for injection are known in the art. If injection is selected as a method for administering the therapy, steps should be taken to ensure that sufficient amounts of the molecules reach their target cells to exert a biological effect.

A pharmaceutical preparation of the invention may be formulated in dosage unit form for ease of administration and uniformity of dosage. Dosage unit form, as used herein, refers to a physically discrete unit of the pharmaceutical preparation appropriate for the patient undergoing treatment. Each dosage should contain a quantity of active ingredient calculated to produce the desired effect in association with the selected pharmaceutical carrier. Procedures for determining the appropriate dosage unit are well known to those skilled in the art. Dosage units may be proportionately increased or decreased based on the weight of the patient. Appropriate concentrations for alleviation of a particular pathological condition may be determined by dosage concentration curve calculations, as known in the art. The appropriate dosage unit for the administration of the molecules of the instant invention may be determined by evaluating the toxicity of the molecules in animal models. Various concentrations of pharmaceutical preparations may be administered to mice with transplanted human tumors, and the minimal and maximal dosages may be determined based on the results of significant reduction of tumor size and side effects as a result of the treatment. Appropriate dosage unit may also be determined by assessing the efficacy of the treatment in combination with other standard therapies.

The pharmaceutical preparation comprising the molecules of the instant invention may be administered at appropriate intervals, for example, at least twice a day or more until the pathological symptoms are reduced or alleviated, after which the dosage may be reduced to a maintenance level. The appropriate interval in a particular case would normally depend on the condition of the patient.

DEFINITIONS

The singular forms "a," "an," and "the" include plural referents unless the context clearly dictates otherwise.

The terms "isolated" is not meant to exclude artificial or synthetic mixtures with other compounds or materials, or the presence of impurities that do not interfere with the fundamental activity, and that may be present, for example, due to incomplete purification, or the addition of stabilizers.

"Pharmaceutically acceptable" indicates approval by a regulatory agency of the Federal or a state government or listed in the U.S. Pharmacopeia or other generally recognized pharmacopeia for use in animals, and more particularly in humans.

A "carrier" refers to, for example, a diluent, adjuvant, preservative (e.g., Thimersol, benzyl alcohol), anti-oxidant (e.g., ascorbic acid, sodium metabisulfite), solubilizer (e.g., polysorbate 80), emulsifier, buffer (e.g., Tris HCl, acetate, phosphate), antimicrobial, bulking substance (e.g., lactose, mannitol), excipient, auxilliary agent or vehicle with which an active agent of the present invention is administered. Pharmaceutically acceptable carriers can be sterile liquids, such as water and oils, including those of petroleum, animal, vegetable or synthetic origin. Water or aqueous saline solutions and aqueous dextrose and glycerol solutions are preferably employed as carriers, particularly for injectable solutions. Suitable pharmaceutical carriers are described in Remington: The Science and Practice of Pharmacy, (Lippincott, Williams and Wilkins); Liberman, et al., Eds., Pharmaceutical Dosage Forms, Marcel Decker, New York, N.Y.; and Rowe, et al., Eds., Handbook of Pharmaceutical Excipients, Pharmaceutical Pr.

The term "treat" as used herein refers to any type of treatment that imparts a benefit to a patient suffering from an injury, including improvement in the condition of the patient (e.g., in one or more symptoms), delay in the progression of the condition, etc.

As used herein, the term "prevent" refers to the prophylactic treatment of a subject who is at risk of developing a condition and/or sustaining an injury, resulting in a decrease in the probability that the subject will develop conditions associated with the hemoglobinopathy or thalassemia.

A "therapeutically effective amount" of a compound or a pharmaceutical composition refers to an amount effective to prevent, inhibit, or treat a particular injury and/or the symptoms thereof. For example, "therapeutically effective amount" may refer to an amount sufficient to modulate the pathology associated with a hemoglobinopathy or thalassemia.

As used herein, the term "subject" refers to an animal, particularly a mammal, particularly a human.

As used herein, the term "small molecule" refers to a substance or compound that has a relatively low molecular weight (e.g., less than 4,000, less than 2,000, particularly less than 1 kDa or 800 Da). Typically, small molecules are organic, but are not proteins, polypeptides, amino acids, or nucleic acids.

An "antibody" or "antibody molecule" is any immunoglobulin, including antibodies and fragments thereof, that binds to a specific antigen. As used herein, antibody or antibody molecule contemplates intact immunoglobulin molecules, immunologically active portions/fragment (e.g., antigen binding portion/fragment) of an immunoglobulin molecule, and fusions of immunologically active portions of an immunoglobulin molecule. Antibody fragments (e.g., antigen binding antibody fragments) include, without limitation, immunoglobulin fragments including, without limitation: single domain (Dab; e.g., single variable light or heavy chain domain), Fab, Fab', F(ab')$_2$, and F(v); and fusions (e.g., via a linker) of these immunoglobulin fragments including, without limitation: scFv, scFv$_2$, scFv-Fc, minibody, diabody, triabody, and tetrabody.

As used herein, the term "immunologically specific" refers to proteins/polypeptides, particularly antibodies, that bind to one or more epitopes of a protein or compound of interest, but which do not substantially recognize and bind other molecules in a sample containing a mixed population of antigenic biological molecules.

As used herein, "prodrug" means any compound that when administered to a biological system generates the drug substance, i.e., active ingredient, as a result of spontaneous chemical reaction(s), enzyme catalyzed chemical reaction(s), photolysis, and/or metabolic chemical reaction(s). A prodrug is, thus, a covalently modified analog or latent form of a compound with either therapeutic or toxic activity.

"Linker" refers to a chemical moiety comprising a chain of atoms that covalently attach at least two compounds. The linker can be linked to any synthetically feasible position of the compounds, but preferably in such a manner as to avoid blocking the compounds desired activity. Linkers are generally known in the art. In a particular embodiment, the linker may contain from 1 to about 50 atoms, from 1 to about 10 atoms, or from about 1 to about 5 atoms.

The term "kit" generally refers to an assembly of materials and/or reagents that is used for a particular application(s). The materials and/or reagents can be provided in the same or in separate containers, and in liquid or in lyophilized form. The amounts and proportions of materials and/or reagents provided in the kit can be selected so as to provide optimum results for a particular application(s).

A "conservative amino acid substitution" refers to amino acid substitutions that substitute functionally-equivalent or similar amino acids. For example, an amino acid may be substituted with an amino acid having a similar polarity, charge, size, and/or aromaticity. In a particular embodiment, a conservative substitutions is a substitution within the same group of amino acids such as non-polar amino acids (e.g., Trp, Phe, Met, Leu, Ile, Val, Ala, Pro, Gly), uncharged polar amino acids (e.g., Ser, Thr, Asn, Gln, Tyr, Cys), acidic amino acids (e.g., Asp, Glu), basic amino acids (e.g., Arg, Lys, His), beta-branched amino acids (e.g., Thr, Val, Ile), and aromatic amino acids (e.g., Trp, Tyr, Phe).

The following examples are provided to illustrate various embodiments of the present invention. The examples are illustrative and not intended to limit the invention in any way.

EXAMPLE 1

Monoclonal antibodies have had a transformative impact on biology and medicine, both as tools for scientific discovery and as precisely targeted therapeutic agents. Their ability to precisely inhibit or activate some biological target of interest, coupled with dramatic engineering successes to allow antibody humanization and enhanced effector functions, antibody-drug conjugates, and bispecific antibodies, together provide ample room for antibodies to continue growing as tools for therapeutic intervention and for enhancing understanding of complex biological systems (Presta, L. G. (2008) Curr. Opin. Immunol., 20:460-70; Deonarain, et al. (2015) Expert Opin. Drug Discov., 10:463-81; Spiess, et al. (2015) Mol. Immunol., 67:95-106).

Most antibody constructs approved as drugs or in current clinical trials address various indications in oncology or immunology by targeting cytokines or cell-surface receptors (Ecker, et al. (2015) MAbs 7:9-14). While aberrant signaling from these antigens is typically localized to a subset of tissue types, the biodistribution of antibody-derived constructs can be hard to precisely control (Glassman, et al. (2015) J. Clin. Pharmacol., 55(Suppl 3):S29-38). This is particularly problematic because many of these potential targets—cytokines and cell-surface receptors—also serve important functions unrelated to the disease state, elsewhere in the body and in other biological processes. Accordingly, such pleiotropic activities can underlie dose-limiting toxicity and/or other adverse events associated with systemic antagonism of these targets (Pauken, et al. (2019) Trends Immunol., 40:511-23; Timlin, et al. (2014) Expert Opin. Biol. Ther., 14:893-904; Cartellieri, et al. (2016) Blood Cancer J., 6:e458; Yu, et al. (2019) Mol. Cancer, 18:125).

To address this, "switchable" antibodies were developed which can be systemically administered, then locally activated in a spatially-regulated manner. More specifically, a ligand-dependent antigen recognition was engineered into an antibody framework. A number of approaches have been described for building small molecule-dependent activity into proteins, most commonly by fusing a (pre-existing) responsive domain into the protein of interest (Ostermeier, M. (2005) Protein Eng. Des. Sel., 18:359-64; Dagliyan, et al. (2019) Nat. Protoc., 14:1863-83) or by splitting the target protein into two separate pieces that are brought together upon assembly of fused ligand-dependent dimerization domains (Kato, et al. (2010) Methods Mol. Biol., 655:359-76; Dagliyan, et al. (2018) Nat. Commun., 9:4042). However, in order to avoid adding an additional domain onto the antibody, the ligand-binding site was integrated directly into the antibody framework itself, thereby avoiding drawbacks associated with the addition of such domains.

The introduction of a tryptophan-to-glycine (W→G) substitution at a carefully selected position can lead to loss of protein activity via discrete conformational changes and/or altered protein stability or dynamics. The subsequent addition of indole—chosen to match the atoms removed by this mutation—can precisely revert this disruption, and thus rescue the protein's activity (Xia, et al. (2013) J. Am. Chem. Soc., 135:18840-9; Deckert, et al. (2012) J. Am. Chem. Soc., 134:10055-60; Budiardjo, et al. (2016) ACS Synth. Biol., 5:1475-84; Kaiser, et al. (2018) ACS Synth. Biol., 7:1152-62). This "indole rescue" strategy has been applied to modulate activity of enzymes, a fluorescent protein, a transcription factor, and an antibody (Xia, et al. (2013) J. Am. Chem. Soc., 135:18840-9; Deckert, et al. (2012) J. Am. Chem. Soc., 134:10055-60; Budiardjo, et al. (2016) ACS Synth. Biol., 5:1475-84; Kaiser, et al. (2018) ACS Synth. Biol., 7:1152-62). However, millimolar concentrations of indole were needed in each case to recover meaningful protein activity. Moreover, a screen of a series of indole analogs determined that none of these analogs rescued activity better than indole itself (Budiardjo, et al. (2016) ACS Synth. Biol., 5:1475-84). This strongly limits the potential applications of these switchable proteins and precludes in vivo applications.

Without being bound by theory, the high concentration of indole needed to activate these designed switches may be a fundamental limitation of the attainable binding affinity available with such a small ligand (Smith, et al. (2012) J. Chem. Inf. Model., 52:2098-106). To overcome this limitation, a computational strategy is provided herein for enumerating larger and more complex cavities that can be introduced into proteins through multiple simultaneous large-to-small mutations at adjacent buried sites. This approach was coupled with virtual screening to define which of these cavities can be complemented with a suitable ligand, thereby serving as the basis for a more effective protein switch. This strategy was applied to screen for candidate mutant/ligand pairings in a model antibody system, a single chain variable fragment (scFv) that recognizes fluorescein as its antigen. A set of cavity-forming mutations that dissociate the heavy and light chains of the scFv are provided herein which allow for rejoining of the heavy and light chains of the scFv back together using a ligand that complements the cavity and restores the precise orientation of the domains needed for recognition of antigen.

Materials and Methods

Plasmid Construction

Because each of the two immunoglobulin domains of an scFv includes a disulfide bond, a periplasmic signal sequence was added at the N-terminus of the scFv in order to express soluble scFv with the correct redox state in an *E. coli* system. This extra 21-residue signal sequence is auto-cleaved during the secretion of the polypeptide into the periplasm (Baumgarten, et al. (2018) Appl. Environ. Microbiol., 84(12):e00270-18; Oelschlaeger, et al. (2003) Appl. Microbiol. Biotechnol., 61:123-132). In addition, to facilitate purification and to improve expression of soluble fractions, a vector that includes a hexa-histidine tag (His-tag) and a maltose binding protein tag (MBP-tag) was used.

The vector DNA selected for cloning was the pET PPL His6 MBP LIC cloning vector (2K-T) (Addgene plasmid #37183). In addition to the features described above, this vector also contains a tobacco etched virus protease cleavage site (TEV-site) between the three tags and the gene of interest. Thus, upon cleavage with TEV protease the desired scFv is produced with no remaining fusion tags. This vector was originally designed for Ligase Independent Cloning (LIC), but due to the emerging popularity and low failure rates of Gibson Assembly (Gibson, et al. (2009) Nat. Methods 6:343-5), it has been adapted for cloning with the latter approach.

Empty vector was transformed into a NEB® Turbo Competent *E. coli* (High Efficiency), plated in a LB agar plate with 100 μg/mL ampicillin, incubated overnight at 37° C. A single colony from the plate was picked and grown in 50 mL of LB broth with 100 μg/mL carbenicillin, incubated with shaking at 250 RPM, overnight at 37° C. Plasmid DNA from liquid culture was isolated according to protocol provided from manufacturer (QIAprep® Spin Miniprep Kit, QIAGEN). Next, the empty vector DNA was linearized using SspI-HF® (NEB), reaction performed according to protocol provided by the manufacturer and linearized vector was gel purified from a 0.8% agarose gel using a QIAquick® Gel Extraction Kit (QIAGEN).

As for insert DNA, WT and mutant genes were synthesized in a double-stranded linear DNA fragment format (GeneArt™ Strings DNA Fragments, ThermoFisher). The WT amino acid sequence was as described (Jung, et al. (1997) Protein Eng., 10:959-966). These genes were prepared for Gibson Assembly by adding the following sequence to the 5'-end of the sense strand and antisense strand, respectively: 5'-TACTTCCAATCCAATGCA-3' (SEQ ID NO: 1) and 5'-TAATAACATTGGAAGTGGA-TAA-3' (SEQ ID NO: 2). DNA strings were supplied in lyophilized vials and were reconstituted with molecular biology grade water.

Gibson assembly of the linearized 2K-T empty vector and prepared inserts were carried out by mixing 2 μL of vector (65 ng/μL) with 8 μL of insert (100 ng/μL), then 10 μL of Gibson Assembly® Master Mix (NEB) was added to the insert/vector mixture. Gibson assembly reaction was allowed to occur at 50° C. for 15 minutes, then cooled down to 4° C. Reaction mixture was used to transform into a NEB® Turbo Competent *E. coli* (High Efficiency) and plated using the same protocol mentioned above. Three colonies from each transformation were picked and plasmid DNA prepared with the same protocol mentioned above, an aliquot of the plasmid DNA was sent out for successful cloning verification, using Sanger sequencing. The primer set used for Sanger sequencing were T7 and T7-term.

Protein Expression scFv genes in 2K-T plasmids were transformed into *E. coli* BL21 (DE3) Competent (NEB) using the protocol suggested by the manufacturer and plated accordingly. A single colony was obtained from the plate and inoculated into a starter culture, 200 mL of TB broth, 0.4% glycerol, 100 μg/mL carbenicillin and incubated with shaking at 250 RPM, overnight at 37° C. Starter culture was inoculated into the main culture (using the same media as starter culture), with the ratio of 1:20 dilution. Main culture was grown with shaking at 200 RPM, at 37° C., until O.D. reached 0.8 (measured at 600 nM), temperature then lowered to 15° C.

and isopropyl β-D-1-thiogalactopyranoside (IPTG) was added to a final concentration of 1 mM, culture was left shaking for 48 hours. Cells were harvested by centrifugations at 3,500× G for 20 minutes. Used media was discarded and cell pellet's surface was rinsed with sterile ddiH$_2$O (pass this point, all samples were kept at 4° C. at all times). Cells were then resuspended in PBS buffer (6 mM phosphate buffer, 150 mM NaCl, pH 7.4) and applied trough a French Press for 3 rounds. Cell lysate was spun down at 15,000× G for 30 minutes and supernatant (which contains soluble scFv) was filtered through a 0.22-micron PES syringe filter.

Western Blots 1 mL of induced cell culture was spun down at 2,400× G for 10 minutes. Used media was discarded, the cell pellet was resuspended in 500 μL 1×PBS, and then 500 μL of BPER-II (Thermo Fisher) detergent was added. The sample was agitated for 10 minutes at room temperature, then spun down at 17,000× G for 10 minutes. The supernatant was collected, mixed with 4×-LDS loading dye, and loaded onto a Bolt™ 4-12 Bis-Tris Plus gel (Invitrogen). After electrophoresis, gel was blotted onto a PVDF membrane using iBlot® 2 kit (Invitrogen).

Anti-His Western blots used 6×-His tag mouse monoclonal primary antibody (Rockland), with a 1:5000 dilution into the binding buffer of the Basic ONE-HOUR Western™ Kit for mouse primary antibody (GenScript). The kit includes an HRP-secondary antibody conjugate, and the Western blot protocol followed instructions provided by the manufacturer. Next, 15 mL of ChromoSensor™ One-Solution TMB Substrate (GenScript) was added to the blot after incubation with shaking (protected from light) and then the reaction was stopped by rinsing the membrane in water. The membrane was allowed to dry, and then imaged.

For anti-kappa western blots, the primary detection molecule was instead a protein L-HRP conjugate (GenScript). The protein L in this conjugate recognizes the kappa-VL of the scFv, and the HRP obviates the need for a secondary antibody. Thus, the same protocol was used as for the anti-His Western blot, except that no secondary antibody was used.

Protein Purification

First, cell lysate was purified with Capto L resin (GE Healthcare) by flowing lysate through the column (flow rate 1 mL/minute) using an ÄKTA pure FPLC system (GE Healthcare). Column was washed using PBS until UV signal reached baseline level. Column was eluted using 15 mM NaOH with eluted fractions directly collected into a tube containing 1M sodium citrate, pH 8.0 (5% of fraction volume). Fractions containing scFv with higher than 70% purity was pooled and concentrated down to 50 mL and dialyzed against 50 mM sodium phosphate, 500 mM NaCl, 5 mM imidazole, pH 8.0 for 3 rounds.

Second, 5 mL of TEV protease 0.1 mg/ml was added to the dialyzed sample in the dialysis bag. The dialysis bag was then moved into a TEV reaction buffer 50 mM sodium phosphate, 500 mM NaCl, 5 mM imidazole, 2 mM DTT (freshly prepared) pH 8.0 and left to dialyze for 4 hours before moving the bag into a fresh batch of the same buffer and left to dialyze overnight. Samples were then dialyzed against 50 mM sodium phosphate, 500 mM NaCl, 5 mM imidazole, pH 8.0 for 3 rounds to remove DTT.

Third, samples were then applied though a Dextrin Sepharose® (GE Healthcare) column (flow rate 1 mL/minute) using an ÄKTA pure FPLC system (GE Healthcare). Flow-through fractions were collected and was then passed through a Ni Sepharose HisTrap FF (GE Healthcare) to remove TEV protease. Again, the flow-through fractions were collected; at this stage scFv are about 90% pure.

Finally, samples were then concentrated down to 2.5 mL and filtered through a 0.22-micron PES syringe filter. Next, the filtered samples were purified using a Superdex 75 size exclusion column (GE Healthcare), using 50 mM sodium phosphate, 500 mM NaCl, 5 mM imidazole, pH 8.0 buffer. Purified samples were then dialyzed into PBS, aliquoted into smaller volumes, then flash frozen with liquid nitrogen and stored at −80° C. for further use. Samples of WT 4D5Flu and triple mutant were analyzed using electrospray ionization mass spectrometry (ESI-MS) (Proteomics and Metabolomics Facility, Wistar), which confirmed that both constructs each contain two disulfide bonds as expected.

Fluorescence Quenching

For the protein titration experiment, samples were prepared by titrating varying concentrations of protein (WT or triple mutant) into PBS containing a final concentration of 10 nM fluorescein and 1% DMSO, with or without 100 μM JK43. For the JK43 titration experiment, samples were prepared by titrating varying concentrations of JK43 into PBS with a final concentration of 10 nM fluorescein, 1% DMSO and 500 nM protein (WT or triple mutant). For the SAR experiment, samples were prepared by adding 10 μM of JK43 analogs into PBS with a final concentration of 10 nM fluorescein, 1% DMSO and 500 nM triple mutant.

Fluorescence quenching experiments were carried out in a SpectraMax® i3x Multi-Mode Microplate Reader (Molecular Devices), using a Costar 96-well black round bottom plates, 200 μL reaction volume, excitation wavelength of 475 nm and emission wavelength of 525 nm, at a temperature of 27° C. Blank measurements containing all sample components except fluorescein were subtracted to remove background. All samples were normalized to a control of fluorescein alone (0% quenching) and buffer alone (100% quenching).

MPTS quenching was monitored in the same manner as fluorescein quenching except for using MPTS instead of fluorescein, 400 nM triple mutant anti-MPTS antibody, and using excitation wavelength 375 nm, and emission wavelength 435 nm.

Differential Scanning Fluorimetry

SYPRO™ Orange dye has higher fluorescence intensity when bound to exposed hydrophobic functional groups of proteins, and thus it provides a probe for proteins' thermal unfolding (Cimmperman, et al. (2008) Biophys. J., 95:3222-31; Zhang, et al. (2010) Curr. Opin. Drug Discov. Devel., 13:389-402; Layton, et al. (2010) Biochemistry 49:10831-41). Differential scanning fluorimetry experiments were carried out in a QuantStudio™ 6 Flex Real-Time PCR System (ThermoFisher), using a 384-well white round bottom plate, 20-30 μL reaction volume, excitation wavelength of 580 nm and emission detected using ROX filter setting (623 nm). Samples were prepared in PBS with 5 μM protein, 5× SYPRO™ Orange (ThermoFisher), and 1.1% DMSO with or without 100 μM JK43. The scFv melting curve was collected from 25-95° C. (0.5° C./min) and data were analyzed with PRISM 6 (GraphPad) using the Gibbs-Helmholtz equation (Matulis, et al. (2005) Biochemistry 44:5258-66) to determine the Tm values. Samples were run in 8 replicates.

NMR Studies

NMR spectra were recorded at 20° C. on a Bruker Avance™ II 600 MHz NMR instrument equipped with a TCI triple-resonance cryogenic probe. The protein sample was dissolved in PBS buffer (6.1 mM phosphate buffer, 154 mM NaCl, pH 7.4), at a concentration of 100 µM.

NMR data were collected using the Bruker standard pulse sequences hsqct1etf3gpsi3d and hsqct2etf3gpsi3d (Kay, et al. (1989) Biochemistry 28:8972-9), then were analyzed using TopSpin 3.2 (Bruker). $T_1$ and $T_2$ relaxation times were determined both by fitting peak intensities of the biggest peak at ~8.3 ppm, and by integrating between 7-10 ppm (covering most amide proton peaks) as a function of 11 relaxation delay intervals (T1: 0.02, 0.05, 0.1, 0.2, 0.3, 0.4, 0.6, 0.8, 1.0, 1.2, and 1.5 s, and T2: 1, 2, 3, 4, 5, 6, 8, 10, 12, 15, 20 s) (Farrow, et al. (1994) Biochemistry 33:5984-6003) based on: $I_{(t)}=I_{(t)}+Pe\hat{\ }(-t/T_1)$ and $I_{(t)}=Pe\hat{\ }(-t/T_2)$. The Igor Pro software (WaveMetrics) was used to calculate the $T_1$ and $T_2$ relaxation times.

Results

In earlier studies of indole rescue, it was possible to simply test one at a time each potential (single) W→G substitution, and compare activity of the mutant in the presence and absence of indole (Xia, et al. (2013) J. Am. Chem. Soc., 135:18840-9; Deckert, et al. (2012) J. Am. Chem. Soc., 134:10055-60; Kaiser, et al. (2018) ACS Synth. Biol., 7:1152-62.). If mutations are allowed at residues other than tryptophan, and multiple mutations can be introduced at once, the number of potential combinations grows rapidly. Further, if each variant harbors a different and more complex cavity, one cannot expect to test activity with a single pre-selected rescuing ligand. For this reason, a new computational pipeline was developed to screen for promising mutant/ligand pairings and applied to the crystal structure of 4D5Flu, a fluorescein-binding scFv.

Computational Strategy: Enumerating Candidate Cavity-Forming Mutations

At the outset, the following criteria were defined for candidate mutations: 1) only double- and triple-mutants were considered; 2) all possible substitutions in which the original residues are replaced by a smaller one were considered, provided that the atoms of new sidechain are an exact subset of the original sidechain (e.g., Thr can be replaced with Ser, Ala, or Gly); 3) the mutations must together remove at least 12 non-hydrogen atoms from the protein; 4) at least one mutated residue must be aromatic; and 5) the mutated sidechains must be in close proximity to one other, so that the resulting cavity will be contiguous.

These criteria were primarily selected such that they would define cavities approximately the size of drug-like chemical matter (e.g., molecular weight 200-500 Da). The requirement that substitutions must leave behind only atoms from the original sidechain circumvents the need for carefully modeling the new cavity explicitly. Instead, the protein variant was modeled by simply removing atoms deleted by the substitution of interest.

These rules were implemented in a new program that is part of the Rosetta macromolecular software suite (Leaver-Fay, et al. (2011) Methods Enzymol., 487:545-74). The program loops over all possible 2- and 3-residue cavity-forming mutations and evaluates adherence to these rules. For each valid combination, the program determines which atoms would be removed from the mutated sidechains. It then exports the corresponding "constellation": the three-dimensional arrangement of deleted atoms in the original protein structure, which in turn defines the shape of the cavity and will thus serve as a template for identifying the complementary ligand.

In addition to these, candidate mutations must be positioned in the antibody framework region (e.g., in the domain-domain interface of the scFv) and none of the target residues could be located in the CDR loops. Applying this exhaustive search to 4D5Flu yielded a collection of 862 unique constellations to serve as templates for virtual screening: each of these corresponding to the cavity produced by a distinct double or triple mutant at the scFv's domain-domain interface.

Computational Strategy: Identifying the Complementary Rescuing Ligand

To search for ligands that might complement individual constellations from the collection, a (virtual) chemical library was assembled. At the time of the study the ZINC12 database (Irwin, et al. (2012) J. Chem. Inf. Model 52:1757-68) was comprised of ~20 million commercially-available compounds. This collection was then curated by filtering for compounds based on Lipinski's criteria (Lipinski, C. A. (2004) Drug Discov. Today Technol., 1:337-41) (to ensure drug-likeness of the compounds ultimately tested), and also required molecular weight ≥180 Da (to avoid fragments like indole not expected to provide sufficient binding affinity) and maximum 4 rotatable bonds (to avoid compounds with long aliphatic chains). Any compounds likely to exhibit pan-assay interference properties (PAINS) (Dahlin, et al. (2015) J. Med. Chem., 58:2091-113; Baell, J. B. (2016) J. Nat. Prod., 79:616-28; Baell, et al. (2014) Nature 513:481-3) or containing a chemically-reactive group (Dahlin, et al. (2014) Future Med. Chem., 6:1265-90) was also excluded. Collectively these filters reduced the size of the collection to ~3 million entries. In order to fit back into the cavity provided by the mutant protein, a given compound must match the three-dimensional shape and properties defined by the constellation. For each compound, a set of ~100 low-energy conformations was built and these were collected into a large 3D "conformer" library comprised of ~300 million entries.

In essence, the challenge of identifying compounds to match a given constellation is analogous to "scaffold hopping" in medicinal chemistry (Hu, et al. (2017) J. Med. Chem., 60:1238-46). The present constellation corresponds to a core structure (albeit without a single bond-connected structure), and an alternate chemical scaffold was sought to engage the same "receptor" (the cavity from which the constellation was generated). Inspired by this analogy, the ROCS scaffold hopping software (Rush, et al. (2005) J. Med. Chem., 48:1489-95; Hawkins, et al. (2007) J. Med. Chem., 50:74-82) was used to rapidly compare every one of the 862 constellations against each of the ~300 million conformers. Each of these ~2.5 billion comparisons (overlays) entailed aligning the conformer onto the constellation, then evaluating their similarity on the basis of overall shape and conservation of chemical features (e.g., position of hydrogen bond donor/acceptors, aromatic rings, etc.).

Finally, to account for the low-resolution nature of these pharmacophore comparisons, models of the protein-ligand complexes from the top-scoring constellation/ligand pairings were explicitly built. While the rescuing ligand is intended to mimic the atoms in the constellation, inevitably some differences arise because the rescuing ligand is a single entity. In particular, there are often additional atoms linking together the functional groups that correspond to parts of the constellation. The extra atoms comprising these linkers, if not chosen carefully, might clash with the walls of the designed cavity.

For a given conformer, the intended alignment to the constellation was already known from the previous step. Because the constellation was taken directly from the protein structure, the ligand-constellation alignment thus provided a starting point for orienting the ligand relative to the protein. Modeling the designed mutations into the protein was also trivial, given the requirement that each sidechain could only be mutated to a smaller residue with atoms corresponding to a subset of the original sidechain. For each of the top-scoring constellation/ligand pairings, then, an initial model of the protein/ligand complex was rapidly generated. This model of the complex was then subjected to refinement using the Rosetta energy function, and the resulting models were filtered on the basis of a series of structural and energetic criteria.

At this point, the top-scoring five designs were selected for experimental characterization. Soluble expression of each construct in *E. coli* was evaluated and the triple mutant ($V_L$F98G/$V_H$V37A/$V_H$W110G) was found to be much more readily produced than the other four (provided with rescue ligand/effector molecule):

$V_L$F98G/$V_H$V37A/$V_H$W47A $V_L$F98G/$V_H$W110G $V_L$Y36G/$V_H$W110G

; and

-continued $V_L$F98A/$V_H$Y95A/$V_H$W110G

While examination of the other four top-scoring models provides insight into the types of matches that emerge from the computational pipeline, on the basis of protein production considerations, the triple mutant was chosen for full characterization.

JK43 Rescues Fluorescein Binding of the 4D5Flu Triple Mutant

4D5Flu is an anti-fluorescein scFv that was generated by grafting the CDR loops from 4-4-20 (anti-fluorescein Fab) (Nieba, et al. (1997) Protein Eng., 10:435-444; Mallender, et al. (1996) J. Biol. Chem., 271:5338-5346) onto a humanized anti-HER2 scFv scaffold called 4D5 (Jung, et al. (1997) Protein Eng., 10:959-966). The two halves of 4D5Flu are connected with a 30-residue linker (Gly$_4$Ser)$_6$ (SEQ ID NO: 3). 4D5Flu is a convenient model system because this construct is readily expressed in *E. coli* and because the intrinsic fluorescence of 4D5Flu's antigen, fluorescein, allows for straightforward monitoring of binding. A triple mutant construct ($V_L$F98G/$V_H$V37A/$V_H$W110G) was introduced into 4D5Flu to reduce activity. WT and triple mutant scFv were expressed and purified and tested in the fluorescein-binding activity (quenching). It was also tested whether the addition of the triple mutant's complementary ligand (JK43=6-(benzyloxy)indazole) restored activity.

Binding by 4D5Flu quenches the fluorescence signal from fluorescein. In the absence of activating ligand, the triple mutant showed diminished quenching relative to WT 4D5Flu (FIG. 1A). Upon addition of 100 μM JK43, activity of the triple mutant is restored nearly to that of WT (FIG. 1A).

Figure 1B:
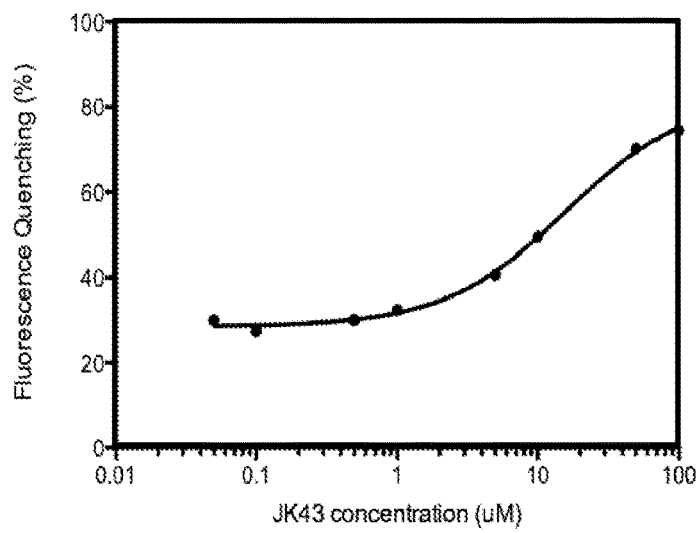
Figure 1C:
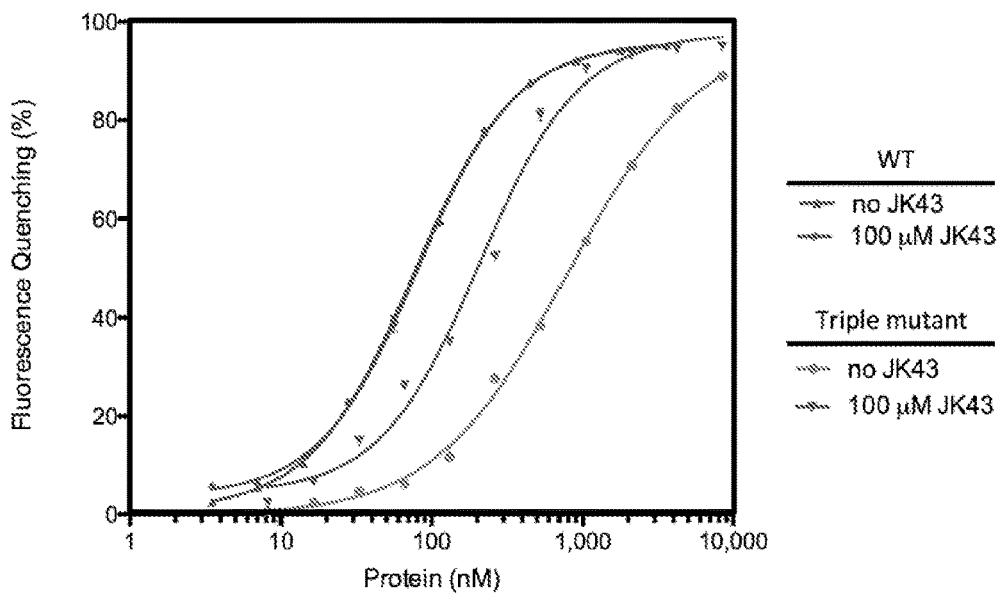

The rescue of fluorescein quenching in the triple mutant exhibited dose-dependency with an EC$_{50}$ of 16 μM (FIG. 1B). In order to verify that the rescued quenching activity was not due to direct fluorescein quenching by JK43, increasing concentrations of either WT or triple mutant protein were titrated into a sample with no JK43 or with a fixed concentration of JK43 (100 μM) (FIG. 1C). It is evident that the presence or absence of JK43 does not affect WT binding curve, whereas addition of JK43 shifts the binding curve of the triple mutant closer that of the WT curve (i.e., the triple mutant's binding affinity for fluorescein is enhanced in the presence of JK43). Though the midpoint of the curves is shifted, the endpoints of the curves match in all cases. This confirms that the difference in fluorescence quenching is not because the triple mutant binds fluorescein in an altered state that is more/less quenched, but rather that mutation and rescue simply modulate binding affinity of the triple mutant for fluorescein.

In summary, collectively introducing these three mutations into 4D5Flu leads to partial loss of antigen-binding activity, and that this activity can be rescued through addition of JK43.

JK43 Stabilizes the Triple Mutant in the Presence of Antigen

Alteration of protein thermostability could lead to inactivation and rescue (Xia, et al. (2013) J. Am. Chem. Soc., 135:18840-18849; Kaiser, et al. (2018) ACS Synth. Biol., 7:1152-1162). Therefore, differential scanning fluorimetry (DSF) was used to examine the effect of this triple mutation on thermostability (Niesen, et al. (2007) Nat. Protoc., 2:2212-21). SYPRO™ Orange dye has higher fluorescence intensity when bound to exposed hydrophobic parts of proteins and, thus, it provides a probe for proteins' thermal unfolding (Cimmperman, et al. (2008) Biophys. J., 95:3222-3231; Zhang, et al. (2010) Curr. Opin. Drug Discov. Devel., 13:389-402; Layton, et al. (2010) Biochemistry 49:10831-10841).

For both the WT and the triple mutant, DSF was used to monitor the thermal unfolding transition that results from increasing temperature. Both unfolding curves were fit using a described equation (Matulis, et al. (2005) Biochemistry 44:5258-5266), resulting in a melting temperatures (Tm) of 56.2° C. and 44.0° C., respectively (FIG. 2A). Upon addition of 5 µM fluorescein (equimolar to protein concentration, and far above the dissociation constant for this interaction), both the WT and the triple mutant show elevated Tm, indicating that bound fluorescein stabilizes the folded protein (FIG. 2B).

In contrast, addition of 100 µM JK43 (without fluorescein) destabilizes both the WT and the triple mutant (FIG. 2C). The change in Tm for the WT scFv (which lacks a designed binding site for JK43) indicates that this compound is destabilizing the protein through a non-specific mechanism, presumably by making the solvent more non-polar and thus stabilizing exposure of the protein's hydrophobic sidechains. The fact that the triple mutant is similarly destabilized indicates that the binding site for JK43 is not present, because the protein does not adopt the necessary conformation in the absence of fluorescein (at least under the tested conditions).

To further test this, the unfolding in the presence of both fluorescein (5 µM) and JK43 (100 µM) was monitored. Under these conditions the WT construct was slightly stabilized, but less than the effect observed with fluorescein alone (FIG. 2D). In essence, these two ligands appear to act independently on the WT construct, in their own competing directions. By contrast, addition of the two ligands together stabilizes the triple mutant more than fluorescein alone. Thus, JK43 can stabilize the triple mutant, but only if it is in a conformation appropriate for antigen binding—which is also the conformation needed for JK43 binding. In this case, addition of fluorescein at a concentration far above the dissociation constant reverses the conformational change resulting from introducing the triple mutation, and thus pre-orders the designed binding site for JK43. This explains why addition of JK43 is destabilizing for the fluorescein-bound WT construct, but stabilizing for the triple mutant.

Collectively, these findings point to positive cooperativity between antigen binding and JK43 binding in the triple mutant construct. The fluorescence quenching experiment demonstrated that JK43 enhanced the triple mutant's binding affinity for antigen, and here the converse was demonstrated: the presence of antigen enhances binding of JK43.

JK43 Enhances the Interaction Between the Two scFv Domains

Next, the structural basis for rescue of activity was tested by characterizing protein conformational changes in the triple mutant associated with addition of JK43. To do so, uniformly $^{15}$N labeled triple mutant protein was produced and longitudinal ($T_1$) and transverse ($T_2$) $^{15}$N relaxation times was measured at 20° C. In a stacked plot of the first spectra of $T_1$ relaxation (delay of 0.02 seconds) of the triple mutant with and without the presence of equimolar JK43 (100 µM), the spectra are dominated by three large peaks around 8.1-8.4 ppm. These peaks mainly arise from glycine and serine residues in the linker, as evidenced by their large intensities and their positions in the $^{15}$N HSQC spectrum. Addition of JK43 results in a 3.4-fold increase in peak intensity (signal to noise ratio is 31 for the protein alone, and 104 upon addition of JK43). While longitudinal $T_1$ $^{15}$N relaxation times remain nearly unchanged between the triple mutant with and without JK43, the calculated transverse $T_2$ $^{15}$N relaxation times are significantly increased after the addition of JK43. This observation is consistent for $T_2$ values obtained both from the calculations based on peak intensity of the glycine residues in the linker (largest glycine peak around 8.3 ppm) and from calculations that integrate values between 7-10 ppm.

For rigid protein molecules, in the limit of slow molecular motion ($\tau_c \gg 0.5$ ns) in high magnetic field (500 MHz or greater), there exists a closed form solution for $\tau_c$ as a function of $T_1/T_2$ $^{15}$N relaxation times (Kay, et al. (1989) Biochemistry 28:8972-9; Farrow, et al. (1994) Biochemistry 33:5984-6003; Barbato, et al. (1992) Biochemistry 31:5269-78): $\tau_c = (1/(4\pi v_N)) \sqrt{(6(T_1/T_2)-7)}$. According to the Stokes-Einstein equation: $\tau_c = (4\pi\eta\alpha^3)/3kT$, where $v_N$ is nuclear frequency, $\eta$ is viscosity, k is Boltzmann constant, T is temperature, and α is hydrodynamic radius. Thus, decreasing $T_1/T_2$ reflects a decrease in $\tau_c$, and a decrease in $\tau_c$ reflects a decrease in α.

The decreased $T_1/T_2$ upon addition of JK43 indicates that upon binding, this ligand reduces the scFv's hydrodynamic radius and its rotational correlation time. Additionally, the peaks in the glycine and serine region of the HSQC spectrum become narrower upon addition of JK43 than the corresponding peaks in the spectrum of protein alone. This indicates increased uniformity of the linker as JK43 induces the protein to become more compact.

These results may seem at odds with those of the thermal unfolding analysis. In the thermal unfolding experiment, evidence of JK43 binding to the triple mutant protein was not observed until antigen was present. By NMR, however, a clear structural response to JK43 was observed even in the absence of antigen. However, the conditions used for these two experiments are different from one another. Most notably, the thermal unfolding transition requires elevated temperature, which in turn can explain the apparent lack of binding in the earlier setting.

Overall, these results are consistent with a model in which the two domains comprising the scFv are dissociated from one another in the triple mutant and then associate in response to addition of JK43. Because residues involved in antigen recognition are distributed across the CDR loops of both domains, this explains loss and then recovery of antigen binding upon mutation and subsequent rescue.

Structure-Activity Relationship of the Rescuing Ligand

From studies of (W→G) substitutions, indole (corresponding exactly to tryptophan's sidechain) provided the most effective rescue of activity. However, other ligands also yielded partial rescue, with rank order commensurate with their similarity to indole (Budiardjo, et al. (2016) ACS Synth. Biol., 5:1475-1484; Kaiser, et al. (2018) ACS Synth. Biol., 7:1152-1162).

A series of JK43 analogs (FIG. 3) were used to explore how varying the structure of the ligand would affect recovery of antigen binding in this particular triple mutant. Given that the two ring systems in JK43 are intended to separately mimic a deleted phenyl ring (from $V_L$F98G) and an indole ring (from $V_H$W110G), the JK43 structure was split in half: the left side consists of the phenyl ring and the ether linker, while the right side is comprised solely of the indole ring.

The degree to which each of these compounds rescues activity of the triple mutant was tested using the fluorescence quenching assay described earlier. At a concentration of 10 μM, it was determined that none of the analogs recovers fluorescein binding to the same extent as JK43 itself (FIG. 3). In addition to those tested in FIG. 3, JK25:

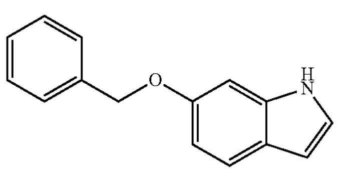

JK25

(6-phenylmethoxy-1H-indole) was also tested. In fluroescence quenching assays, JK25 was determined to have an $EC_{50}$ of 25 μM for JK25 and 16 μM for JK43. These observations are consistent with the model in which the rescuing ligand precisely binds to the cavity left by the cavity-forming mutations. Further, these observations support the utility of detailed structure-based modeling for identifying suitable ligands for a given cavity. An optimal ligand would be one that precisely matches the three-dimensional arrangement of the deleted atoms.

Transferability of the Triple Mutant/JK43 Switch

JK43 can also serve as a suitable rescuing ligand for the corresponding mutation in other antibodies or scFv's, provided they share the three deleted sidechains in the same arrangement as in 4D5Flu. Notably, all three residues comprising this constellation are present in 63% of the 150,697 total entries in the AbYsis database (Swindells, et al. (2017) J. Mol. Biol., 429:356-364). Among antibodies with solved structure, as collected in the SAbDab database (Dunbar, et al. (2014) Nucleic Acids Res., 42:D1140-1146), 78% of the 3,179 entries have this constellation in precisely the same geometry as 4D5Flu. The fact that this constellation is so strongly conserved among antibody sequences and structures indicates that this triple mutant coupled with JK43 can serve as a very general means to modulate activity of antibodies or scFv's, without the need to repeat the computational design calculations for (most) individual antibodies of interest. Indeed, with respect to therapeutic antibodies already in the clinic, this particular constellation/ligand pairing could be found, for example, in Ipilimumab (anti-CTLA-4, PDB ID: 5XJ3), Atezolimumab (anti-PD-L1, PDB ID: 5X8L), Nivolumab (anti-PD-1, PDB ID: 5GGR) and Adalimumab (anti-TNF-α, PDB ID: 3WD5) (FIG. 4D).

To test the transferability of the design, another model scFv that shares this constellation was selected. Specifically, an scFv which recognized MPTS as its antigen was selected. The antibody 8B10 was affinity matured to recognize the fluorescent dye 8-methoxypyrene-1,3,6-trisulfonic acid (MPTS) as its antigen (Adhikary, et al. (2012) J. Biol. Chem., 287:27139-47; Adhikary, et al. (2015) Biochemistry 54:2085-93), and it quenches MPTS fluorescence upon binding. Although both fluorescein and MPTS are fluorescent dyes, their chemical structures are quite different (FIG. 4A). Additionally, the scFv's that recognize these antigens are very different, sharing only 56% sequence identity outside of the serine-glycine linker (FIG. 4B). Unsurprisingly, given their different antigens, the CDR loops in both scFv's differ in both their lengths and their conformations. Despite these differences, however, both share the precise arrangement of the key residues that comprise the constellation, indicating that the anti-MPTS scFv can also be modulated using precisely the same mutation/ligand pairing that was characterized using 4D5Flu.

An scFv version of 8B10 was designed by directly transferring to it the serine/glycine linker from 4D5Flu. The triple mutation was then incorporated into the 8B10 scFv. The same triple mutant was tested in the context of this anti-MPTS scFv and MPTS quenching was used as a measure of scFv binding. In the absence of JK43 this mutant scFv quenching MPTS with an $EC_{50}$ value of 1.0 μM. Upon addition of JK43, however, the $EC_{50}$ value is reduced to 0.1 μM (FIG. 4C). Thus, the studies of this mutation/ligand pair in the context of 4D5Flu allowed the generation an analogous switch in an unrelated antibody, by virtue of this structurally-conserved constellation. These results confirm that this mutation/ligand pairing is transferrable, provided that the scFv of interest harbors these conserved residues in the same geometry as in 4D5Flu.

The broad utility of antibodies—as therapeutics and as research tools—has motivated the desire for variants with antigen-binding activity that can be externally controlled. Applications drawn from cancer therapeutics exemplify this need: both chimeric antigen receptor engineered T cells (CAR-Ts) and checkpoint inhibitors are susceptible to adverse effects from off-tumor, on-target side effects from cross-reactivity with healthy tissues (Pauken, et al. (2019) Trends Immunol., 40:511-23; Timlin, et al. (2014) Expert Opin. Biol. Ther., 14:893-904; Cartellieri, et al. (2016) Blood Cancer J., 6:e458; Yu, et al. (2019) Mol. Cancer 18:125). Some approaches to this problem seek to simply localize the antibody or CAR-T cell using tumor-selective markers: for example, building in targeting using bispecific formats of antibodies (Ishiguro, et al. (2017) Sci. Transl. Med., 2017:9; Dheilly, et al. (2017) Mol. Ther., 25:523-33; He, et al. (2019) Methods Mol. Biol., 1884:335-47; Zhang, et al. (2019) Proc. Natl. Acad. Sci., 116:15889-94) or adaptor modules in CAR-T cells (Cartellieri, et al. (2016) Blood Cancer J., 6:e458; Rodgers, et al. (2016) Proc. Natl. Acad. Sci., 113:E459-68; Ma, et al. (2016) Proc. Natl. Acad. Sci., 113:E450-8; Kim, et al. (2015) J. Am. Chem. Soc., 137:2832-5) that recognize tumor markers. In contrast to these "passive" localization strategies, other approaches instead seek to control antibody activity through direct responsiveness to external stimuli.

Such approaches require that antigen binding be directly dependent on some external stimulus. For example, an scFv linker can be redesigned to include a conformationally-responsive binding site drawn from some other protein, such that a conformational change in the fused protein pulls apart the folded scFv. By incorporating either an elastin-like polypeptide (Megeed, et al. (2006) Biomacromolecules 7:999-1004; Blenner, et al. (2008) Protein Sci., 17:527-36) or calmodulin (Kellmann, et al. (2017) MAbs 9:404-18) into the scFv linker, for example, antigen-binding could be coupled to changes in ionic strength or to a peptide. However, it is unclear to what extent re-engineering the scFv linker might be extensible to other antibody formats.

In the study presented here, a robust and transferrable allosteric antibody switch was created that can be selectively activated using a bio-orthogonal ligand with drug-like physicochemical properties. The triple mutant/JK43 pairing has been directly transferred to an unrelated antibody framework and can be for other antibodies that include this constellation of residues.

EXAMPLE 2

CTLA-4 (also known as CD152) is an immune inhibitory receptor constitutively expressed on regulatory T cells (Tregs). CTLA-4 is also upregulated in activated T cells and plays a critical role in regulating immune responses to tumor antigens. Significantly, blocking CTLA-4 has been shown to result in reduced tumor size. Indeed, antibodies against CTLA-4 are important checkpoint inhibitors currently used in clinic for the treatment of various cancers. Ipilimumab (YERVOY®), a monoclonal antibody against CTLA-4 has been shown to increase the immune system's response to melanoma cells and other tumors. Other therapeutic antibodies targeting CTLA-4 and designed to block the interaction of CTLA-4 with its ligands CD80 and CD86 have also been shown to be efficacious in the treatment of a variety of cancers. However, antibodies against CTLA-4 generally have dose-limiting toxicities. Accordingly, there is a great need to reduce off-tumor effects of these antibodies.

Two anti-CTLA-4 scFv constructs (3GSWT with -GG (GGSGG)$_3$GG- linker (SEQ ID NO: 6) and 5GSWT with -GG(GGSGG)$_5$GG- linker (SEQ ID NO: 7)) were generated based on ipilimumab. The activity of each scFv antibody construct was compared via a sandwich ELISA assay (BioLegend; San Diego, CA), according to the manufacturer's instruction. As seen in FIG. 6, the two generated scFv constructs readily bind CTLA-4, albeit slightly less potently than ipilimumab.

The triple mutation ($V_L$F98G/$V_H$V37A/$V_H$W110G) was introduced into the 5GSWT scFv construct. The ability of JK43 to rescue the triple mutant was then tested. Briefly, the ability of the wild-type (5GSWT scFv construct) and triple mutant constructs to bind CTLA-4 was tested in the presence or absence of JK43 using the above sandwich ELISA assay, according to the manufacturer's instructions. As seen in FIG. 7, the wild-type construct was capable of targeting CTLA-4 and the presence of JK43 had no effect on the binding of the scFv to CTLA-4. In stark contrast, the triple mutant was a poor binder of CTLA-4 in the absence of JK43. However, the presence of JK43 dramatically increased the affinity of the triple mutant scFv for CTLA-4.

The ability to rescue the triple mutant scFv was then tested in a cellular context. Briefly, neutralization of the anti-CTLA-4 scFv in a cellular context was tested using the CTLA-4 Blockade Bioassay from Promega (Madison, WI), according to the manufacturer's instruction. The CTLA-4 Blockade Bioassay is a bioluminescent cell-based assay which utilizes CTLA-4 Effector Cells (Jurkat T cells expressing human CTLA-4 and a luciferase reporter driven by a native promoter which responds to TCR/CD28 activation) and artificial antigen presenting cells (aAPCs) (Raji cells expressing an engineered cell surface protein designed to activate cognate TCRs in an antigen-independent manner and endogenously expressing CTLA-4 ligands CD80 and CD86) (Promega). Blockage of the interaction of CTLA-4 with its ligands CD80 and CD86 (e.g., by addition of an anti-CTLA-4 antibody) results in promoter-mediated luminescence. As seen in FIG. 8, the wild-type construct (5GSWT) was capable of targeting and blocking CTLA-4 and the presence of JK43 had little effect on the binding of the scFv to CTLA-4. In stark contrast, the triple mutant (5GS3'M) was a poor binder and blocker of CTLA-4 in the absence of JK43. However, the presence of JK43 (50 μM) restored the affinity of the triple mutant scFv for CTLA-4 and its ability to block its interactions. Vehicle alone (DMSO) is not neutralizing and establishes the background to be expected in the absence of a neutralizing antibody.

While certain of the preferred embodiments of the present invention have been described and specifically exemplified above, it is not intended that the invention be limited to such embodiments. Various modifications may be made thereto without departing from the scope and spirit of the present invention, as set forth in the following claims.

What is claimed is:

1. An allosteric antibody comprising at least three amino acid substitutions at positions corresponding to Trp110 and Val37 in the heavy chain and a substitution corresponding to Phe98 in its light chain within an antigen-binding antibody, wherein the numbering is based on the positioning in the 4D5Flu antibody, wherein said amino acid substitutions form a contiguous cavity within the allosteric antibody which can be bound by an effector molecule, wherein the effector molecule comprises the amino acid side chains, or analog thereof, that were removed from the antibody by the at least three substitutions, wherein the allosteric antibody has reduced binding affinity for antigen, and wherein the binding affinity of the allosteric antibody for antigen is increased or restored upon binding with an effector molecule.

2. The allosteric antibody of claim 1, wherein said amino acid substitutions are within the variable regions of said antigen-binding antibody.

3. The allosteric antibody of claim 1, wherein said amino acid substitutions result in the removal of at least 12 heavy atoms from the antigen-binding antibody.

4. The allosteric antibody of claim 1, wherein at least one of said amino acid substitutions is the substitution of a phenylalanine, tyrosine, or tryptophan to another amino acid.

5. The allosteric antibody of claim 1, wherein at least one of said amino acid substitutions is in the heavy chain of the antigen-binding antibody and at least one of said amino acid substitutions is in the light chain of the antigen-binding antibody.

6. The allosteric antibody of claim 1, wherein at least one of said amino acid substitutions is in the heavy chain variable region of the antigen-binding antibody and at least one of said amino acid substitutions is in the light chain variable region of the antigen-binding antibody.

7. The allosteric antibody of claim 1, wherein the amino acid substitutions comprise the substitution of an amino acid with glycine or alanine.

8. The allosteric antibody of claim 1 which is a monoclonal antibody.

9. The allosteric antibody of claim 1 which is an antigen-binding antibody fragment.

10. The allosteric antibody of claim 9, wherein said antigen-binding antibody fragment is an scFv or Fab fragment.

11. The allosteric antibody of claim 1, comprising a Trp110Gly substitution in the heavy chain and a Phe98Gly substitution in the light chain.

12. The allosteric antibody of claim 1, comprising a Trp110Gly substitution in the heavy chain and a Tyr36Gly substitution in its light chain.

13. The allosteric antibody of claim 1, comprising Trp47Ala and Val37Ala substitutions in the heavy chain and a Phe98Gly substitution in its light chain.

14. The allosteric antibody of claim 1, comprising Trp110Gly and Tyr95Ala substitutions in the heavy chain and a Phe98Ala substitution in its light chain.

15. The allosteric antibody of claim 1, wherein the substitutions are with glycine or alanine.

16. The allosteric antibody of claim 1, comprising Trp110Gly and Val37Ala substitutions in the heavy chain and a Phe98Gly substitution in its light chain.

17. A method of modulating the activity of an allosteric antibody, said method comprising contacting the allosteric antibody of claim 1 with an effector molecule.

18. The method of claim 17, wherein the effector molecule comprises the amino acid side chains that were removed from the antigen-binding antibody by the substitutions to make the allosteric antibody, and wherein the amino acid side chains are joined by a linker.

19. The method of claim 17, wherein said effector molecule is 6-phenylmethoxy-1H-indazole.

20. The method of claim 17, wherein said effector molecule is 6-phenylmethoxy-1H-indole.

21. The method of claim 17, wherein said allosteric antibody and effector molecule are administered to a subject.

22. The method of claim 17, wherein said allosteric antibody and effector molecule are administered in different compositions.

23. The method of claim 22, wherein said allosteric antibody and effector molecule are administered at different times and/or different means.

24. The method of claim 22, wherein said allosteric antibody is administered systemically or intravenously and said effector molecule is delivered to the site of desired activity.

25. The method of claim 24, wherein said effector molecule is delivered to a tumor.

26. The method of claim 24, wherein said effector molecule is administered by direct injection or transdermally.

* * * * *

SEQUENCE LISTING

<160> NUMBER OF SEQ ID NOS: 26

<210> SEQ ID NO 1
<211> LENGTH: 18
<212> TYPE: DNA
<213> ORGANISM: Artificial Sequence
<220> FEATURE:
<223> OTHER INFORMATION: Primer

<400> SEQUENCE: 1
tacttccaat ccaatgca                                          18

<210> SEQ ID NO 2
<211> LENGTH: 22
<212> TYPE: DNA
<213> ORGANISM: Artificial Sequence

```
<220> FEATURE:
<223> OTHER INFORMATION: Primer

<400> SEQUENCE: 2
taataacatt ggaagtggat aa                                              22

<210> SEQ ID NO 3
<211> LENGTH: 30
<212> TYPE: PRT
<213> ORGANISM: Artificial Sequence
<220> FEATURE:
<223> OTHER INFORMATION: Linker

<400> SEQUENCE: 3
```

Gly Gly Gly Gly Ser Gly Gly Gly Ser Gly Gly Gly Gly Ser Gly
1               5                   10                  15

Gly Gly Gly Ser Gly Gly Gly Gly Ser Gly Gly Gly Gly Ser
            20                  25                  30

```
<210> SEQ ID NO 4
<211> LENGTH: 265
<212> TYPE: PRT
<213> ORGANISM: Artificial Sequence
<220> FEATURE:
<223> OTHER INFORMATION: 4D5Flu scFv

<400> SEQUENCE: 4
```

Asp Tyr Lys Asp Ile Gln Met Thr Gln Ser Pro Ser Ser Leu Ser Ala
1               5                   10                  15

Ser Val Gly Asp Arg Val Thr Ile Thr Cys Arg Ala Ser Gln Ser Leu
            20                  25                  30

Val His Ser Gln Gly Asn Thr Tyr Leu Arg Trp Tyr Gln Gln Lys Pro
        35                  40                  45

Gly Lys Ala Pro Lys Val Leu Ile Tyr Lys Val Ser Asn Arg Phe Ser
    50                  55                  60

Gly Val Pro Ser Arg Phe Ser Gly Ser Gly Ser Gly Thr Asp Phe Thr
65                  70                  75                  80

Leu Thr Ile Ser Ser Leu Gln Pro Glu Asp Phe Ala Thr Tyr Tyr Cys
                85                  90                  95

Gln Gln Ser Thr His Val Pro Trp Thr Phe Gly Gln Gly Thr Lys Val
            100                 105                 110

Glu Leu Lys Arg Ala Gly Gly Gly Gly Ser Gly Gly Gly Gly Ser Gly
        115                 120                 125

Gly Gly Gly Ser Gly Gly Gly Gly Ser Gly Gly Gly Gly Ser Gly Gly
    130                 135                 140

Gly Gly Ser Glu Val Gln Leu Val Glu Ser Gly Gly Gly Leu Val Gln
145                 150                 155                 160

Pro Gly Gly Ser Leu Arg Leu Ser Cys Ala Ala Ser Gly Phe Thr Phe
                165                 170                 175

Ser Asp Tyr Trp Met Asn Trp Val Arg Gln Ala Pro Gly Lys Gly Leu
            180                 185                 190

Glu Trp Val Ala Gln Ile Arg Asn Lys Pro Tyr Asn Tyr Glu Thr Tyr
        195                 200                 205

Tyr Ala Asp Ser Val Lys Gly Arg Phe Thr Ile Ser Arg Asp Thr Ser
    210                 215                 220

Lys Asn Thr Val Tyr Leu Gln Met Asn Ser Leu Arg Ala Glu Asp Thr
225                 230                 235                 240

Ala Val Tyr Tyr Cys Thr Gly Ser Tyr Tyr Gly Met Asp Tyr Trp Gly

```
                    245                 250                 255

Gln Gly Thr Leu Val Thr Val Ser Ser
                260                 265

<210> SEQ ID NO 5
<211> LENGTH: 264
<212> TYPE: PRT
<213> ORGANISM: Artificial Sequence
<220> FEATURE:
<223> OTHER INFORMATION: 8B10 scFv

<400> SEQUENCE: 5

Asp Ile Val Leu Thr Gln Ser Pro Ala Ser Leu Ala Val Ser Leu Gly
1               5                   10                  15

Gln Arg Ala Thr Ile Ser Cys Arg Ala Ser Glu Ser Val Asp Ser Tyr
            20                  25                  30

Gly Ile Ser Phe Met His Trp Tyr Gln Gln Lys Pro Gly Gln Pro Pro
        35                  40                  45

Lys Leu Leu Ile Tyr Arg Ala Ser Asn Leu Glu Ser Gly Ile Pro Ala
    50                  55                  60

Arg Phe Ser Gly Ser Gly Ser Arg Thr Asp Phe Thr Leu Thr Ile Ile
65                  70                  75                  80

Pro Val Glu Ala Asp Asp Val Ala Thr Tyr Tyr Cys Gln Gln Ser Asn
                85                  90                  95

Glu Asp Pro Arg Thr Phe Gly Gly Gly Thr Lys Val Glu Leu Lys Arg
            100                 105                 110

Ala Gly Gly Gly Ser Gly Gly Gly Ser Gly Gly Gly Gly Ser
        115                 120                 125

Gly Gly Gly Gly Ser Gly Gly Gly Ser Gly Gly Gly Gly Ser Glu
    130                 135                 140

Val Gln Leu Gln Gln Ser Gly Pro Glu Leu Val Lys Pro Gly Thr Ser
145                 150                 155                 160

Val Lys Met Ser Cys Lys Ala Ser Gly Tyr Thr Phe Thr Asp Tyr Tyr
                165                 170                 175

Met His Trp Val Lys Gln Ser His Gly Lys Ser Leu Glu Trp Ile Gly
            180                 185                 190

Tyr Ile Tyr Pro Asn Asn Gly Gly Asn Gly Tyr Asn Gln Lys Phe Lys
        195                 200                 205

Gly Lys Ala Thr Leu Thr Val Asp Lys Ser Ser Thr Ala Tyr Met
    210                 215                 220

Glu Leu Arg Ser Leu Thr Ser Glu Asp Ser Ala Val Tyr Tyr Cys Ala
225                 230                 235                 240

Arg Arg Gly Gly Tyr Gly Ser Arg Gly Tyr Phe Asp Val Trp Gly Thr
                245                 250                 255

Gly Thr Thr Val Thr Val Ser Ser
            260

<210> SEQ ID NO 6
<211> LENGTH: 19
<212> TYPE: PRT
<213> ORGANISM: Artificial Sequence
<220> FEATURE:
<223> OTHER INFORMATION: Linker

<400> SEQUENCE: 6

Gly Gly Gly Gly Ser Gly Gly Gly Gly Ser Gly Gly Gly Gly Ser Gly
1               5                   10                  15
```

-continued

Gly Gly Gly

<210> SEQ ID NO 7
<211> LENGTH: 29
<212> TYPE: PRT
<213> ORGANISM: Artificial Sequence
<220> FEATURE:
<223> OTHER INFORMATION: Linker

<400> SEQUENCE: 7

Gly Gly Gly Gly Ser Gly Gly Gly Ser Gly Gly Gly Ser Gly
1               5                   10                  15

Gly Gly Ser Gly Gly Gly Ser Gly Gly Gly Gly
            20                  25

<210> SEQ ID NO 8
<211> LENGTH: 117
<212> TYPE: PRT
<213> ORGANISM: Artificial Sequence
<220> FEATURE:
<223> OTHER INFORMATION: 4D5Flu light chain variable domain

<400> SEQUENCE: 8

Asp Tyr Lys Asp Ile Gln Met Thr Gln Ser Pro Ser Ser Leu Ser Ala
1               5                   10                  15

Ser Val Gly Asp Arg Val Thr Ile Thr Cys Arg Ala Ser Gln Ser Leu
            20                  25                  30

Val His Ser Gln Gly Asn Thr Tyr Leu Arg Trp Tyr Gln Gln Lys Pro
        35                  40                  45

Gly Lys Ala Pro Lys Val Leu Ile Tyr Lys Val Ser Asn Arg Phe Ser
    50                  55                  60

Gly Val Pro Ser Arg Phe Ser Gly Ser Gly Ser Gly Thr Asp Phe Thr
65                  70                  75                  80

Leu Thr Ile Ser Ser Leu Gln Pro Glu Asp Phe Ala Thr Tyr Tyr Cys
                85                  90                  95

Gln Gln Ser Thr His Val Pro Trp Thr Phe Gly Gln Gly Thr Lys Val
            100                 105                 110

Glu Leu Lys Arg Ala
        115

<210> SEQ ID NO 9
<211> LENGTH: 113
<212> TYPE: PRT
<213> ORGANISM: Artificial Sequence
<220> FEATURE:
<223> OTHER INFORMATION: 8B10 light chain variable domain

<400> SEQUENCE: 9

Asp Ile Val Leu Thr Gln Ser Pro Ala Ser Leu Ala Val Ser Leu Gly
1               5                   10                  15

Gln Arg Ala Thr Ile Ser Cys Arg Ala Ser Glu Ser Val Asp Ser Tyr
            20                  25                  30

Gly Ile Ser Phe Met His Trp Tyr Gln Gln Lys Pro Gly Gln Pro Pro
        35                  40                  45

Lys Leu Leu Ile Tyr Arg Ala Ser Asn Leu Glu Ser Gly Ile Pro Ala
    50                  55                  60

Arg Phe Ser Gly Ser Gly Ser Arg Thr Asp Phe Thr Leu Thr Ile Ile
65                  70                  75                  80

Pro Val Glu Ala Asp Asp Val Ala Thr Tyr Tyr Cys Gln Gln Ser Asn
                85                  90                  95

Glu Asp Pro Arg Thr Phe Gly Gly Gly Thr Lys Val Glu Leu Lys Arg
                100                 105                 110
Ala

<210> SEQ ID NO 10
<211> LENGTH: 107
<212> TYPE: PRT
<213> ORGANISM: Artificial Sequence
<220> FEATURE:
<223> OTHER INFORMATION: Adalimumab light chain variable domain

<400> SEQUENCE: 10

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Gly Ile Arg Asn Tyr
            20                  25                  30

Leu Ala Trp Tyr Gln Gln Lys Pro Gly Lys Ala Pro Lys Leu Leu Ile
        35                  40                  45

Tyr Ala Ala Ser Thr Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Val Ala Thr Tyr Tyr Cys Gln Arg Tyr Asn Arg Ala Pro Tyr
                85                  90                  95

Thr Phe Gly Gln Gly Thr Lys Val Glu Ile Lys
                100                 105

<210> SEQ ID NO 11
<211> LENGTH: 107
<212> TYPE: PRT
<213> ORGANISM: Artificial Sequence
<220> FEATURE:
<223> OTHER INFORMATION: Atezolizumab light chain variable domain

<400> SEQUENCE: 11

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Val Ser Thr Ala
            20                  25                  30

Val Ala Trp Tyr Gln Gln Lys Pro Gly Lys Ala Pro Lys Leu Leu Ile
        35                  40                  45

Tyr Ser Ala Ser Phe Leu Tyr Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Tyr Leu Tyr His Pro Ala
                85                  90                  95

Thr Phe Gly Gln Gly Thr Lys Val Glu Ile Lys
                100                 105

<210> SEQ ID NO 12
<211> LENGTH: 108
<212> TYPE: PRT
<213> ORGANISM: Artificial Sequence
<220> FEATURE:
<223> OTHER INFORMATION: Ipilimumab light chain variable domain

<400> SEQUENCE: 12

Glu Ile Val Leu Thr Gln Ser Pro Gly Thr Leu Ser Leu Ser Pro Gly

```
1               5                   10                  15
Glu Arg Ala Thr Leu Ser Cys Arg Ala Ser Gln Ser Val Gly Ser Ser
            20                  25                  30

Tyr Leu Ala Trp Tyr Gln Gln Lys Pro Gly Gln Ala Pro Arg Leu Leu
            35                  40                  45

Ile Tyr Gly Ala Phe Ser Arg Ala Thr Gly Ile Pro Asp Arg Phe Ser
            50                  55                  60

Gly Ser Gly Ser Gly Thr Asp Phe Thr Leu Thr Ile Ser Arg Leu Glu
65                  70                  75                  80

Pro Glu Asp Phe Ala Val Tyr Tyr Cys Gln Gln Tyr Gly Ser Ser Pro
            85                  90                  95

Trp Thr Phe Gly Gln Gly Thr Lys Val Glu Ile Lys
            100                 105

<210> SEQ ID NO 13
<211> LENGTH: 107
<212> TYPE: PRT
<213> ORGANISM: Artificial Sequence
<220> FEATURE:
<223> OTHER INFORMATION: Nivolumab light chain variable domain

<400> SEQUENCE: 13

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Gln Ser Val Ser Ser Tyr
            20                  25                  30

Leu Ala Trp Tyr Gln Gln Lys Pro Gly Gln Ala Pro Arg Leu Leu Ile
            35                  40                  45

Tyr Asp Ala Ser Asn Arg Ala Thr Gly Ile Pro Ala Arg Phe Ser Gly
            50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Ser Ser Asn Trp Pro Arg
            85                  90                  95

Thr Phe Gly Gln Gly Thr Lys Val Glu Ile Lys
            100                 105

<210> SEQ ID NO 14
<211> LENGTH: 118
<212> TYPE: PRT
<213> ORGANISM: Artificial Sequence
<220> FEATURE:
<223> OTHER INFORMATION: 4D5Flu heavy chain variable domain

<400> SEQUENCE: 14

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Asp Tyr
            20                  25                  30

Trp Met Asn Trp Val Arg Gln Ala Pro Gly Lys Gly Leu Glu Trp Val
            35                  40                  45

Ala Gln Ile Arg Asn Lys Pro Tyr Asn Tyr Glu Thr Tyr Tyr Ala Asp
            50                  55                  60

Ser Val Lys Gly Arg Phe Thr Ile Ser Arg Asp Thr Ser Lys Asn Thr
65                  70                  75                  80

Val Tyr Leu Gln Met Asn Ser Leu Arg Ala Glu Asp Thr Ala Val Tyr
            85                  90                  95
```

Tyr Cys Thr Gly Ser Tyr Tyr Gly Met Asp Tyr Trp Gly Gln Gly Thr
           100                 105                 110

Leu Val Thr Val Ser Ser
        115

<210> SEQ ID NO 15
<211> LENGTH: 121
<212> TYPE: PRT
<213> ORGANISM: Artificial Sequence
<220> FEATURE:
<223> OTHER INFORMATION: 8B10 heavy chain variable domain

<400> SEQUENCE: 15

Glu Val Gln Leu Leu Glu Ser Gly Pro Glu Leu Val Lys Pro Gly Thr
1               5                   10                  15

Ser Val Lys Met Ser Cys Lys Ala Ser Gly Tyr Thr Phe Thr Asp Tyr
            20                  25                  30

Tyr Met His Trp Val Lys Gln Ser His Gly Lys Ser Leu Glu Trp Ile
        35                  40                  45

Gly Tyr Ile Tyr Pro Asn Asn Gly Asn Gly Tyr Asn Gln Lys Phe
    50                  55                  60

Lys Gly Lys Ala Thr Leu Thr Val Asp Lys Ser Ser Thr Ala Tyr
65                  70                  75                  80

Met Glu Leu Arg Ser Leu Thr Ser Glu Asp Ser Ala Val Tyr Tyr Cys
                85                  90                  95

Ala Arg Arg Gly Gly Tyr Gly Ser Arg Gly Tyr Phe Asp Val Trp Gly
            100                 105                 110

Ala Gly Thr Thr Val Thr Val Ser Ser
            115                 120

<210> SEQ ID NO 16
<211> LENGTH: 121
<212> TYPE: PRT
<213> ORGANISM: Artificial Sequence
<220> FEATURE:
<223> OTHER INFORMATION: Adalimumab heavy chain variable domain

<400> SEQUENCE: 16

Glu Val Gln Leu Val Glu Ser Gly Gly Gly Leu Val Gln Pro Gly Arg
1               5                   10                  15

Ser Leu Arg Leu Ser Cys Ala Ala Ser Gly Phe Thr Phe Asp Asp Tyr
            20                  25                  30

Ala Met His Trp Val Arg Gln Ala Pro Gly Lys Gly Leu Glu Trp Val
        35                  40                  45

Ser Ala Ile Thr Trp Asn Ser Gly His Ile Asp Tyr Ala Asp Ser Val
    50                  55                  60

Glu Gly Arg Phe Thr Ile Ser Arg Asp Asn Ala Lys Asn Ser Leu Tyr
65                  70                  75                  80

Leu Gln Met Asn Ser Leu Arg Ala Glu Asp Thr Ala Val Tyr Tyr Cys
                85                  90                  95

Ala Lys Val Ser Tyr Leu Ser Thr Ala Ser Ser Leu Asp Tyr Trp Gly
            100                 105                 110

Gln Gly Thr Leu Val Thr Val Ser Ser
            115                 120

<210> SEQ ID NO 17
<211> LENGTH: 118
<212> TYPE: PRT
<213> ORGANISM: Artificial Sequence

```
<220> FEATURE:
<223> OTHER INFORMATION: Atezolizumab heavy chain variable domain

<400> SEQUENCE: 17

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Asp Ser
            20                  25                  30

Trp Ile His Trp Val Arg Gln Ala Pro Gly Lys Gly Leu Glu Trp Val
        35                  40                  45

Ala Trp Ile Ser Pro Tyr Gly Gly Ser Thr Tyr Tyr Ala Asp Ser Val
    50                  55                  60

Lys Gly Arg Phe Thr Ile Ser Ala Asp Thr Ser Lys Asn Thr Ala Tyr
65                  70                  75                  80

Leu Gln Met Asn Ser Leu Arg Ala Glu Asp Thr Ala Val Tyr Tyr Cys
                85                  90                  95

Ala Arg Arg His Trp Pro Gly Gly Phe Asp Tyr Trp Gly Gln Gly Thr
            100                 105                 110

Leu Val Thr Val Ser Ser
        115

<210> SEQ ID NO 18
<211> LENGTH: 118
<212> TYPE: PRT
<213> ORGANISM: Artificial Sequence
<220> FEATURE:
<223> OTHER INFORMATION: Ipilimumab heavy chain variable domain

<400> SEQUENCE: 18

Gln Val Gln Leu Val Glu Ser Gly Gly Gly Val Val Gln Pro Gly Arg
1               5                   10                  15

Ser Leu Arg Leu Ser Cys Ala Ala Ser Gly Phe Thr Phe Ser Ser Tyr
            20                  25                  30

Thr Met His Trp Val Arg Gln Ala Pro Gly Lys Gly Leu Glu Trp Val
        35                  40                  45

Thr Phe Ile Ser Tyr Asp Gly Asn Asn Lys Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Ile Tyr Tyr Cys
                85                  90                  95

Ala Arg Thr Gly Trp Leu Gly Pro Phe Asp Tyr Trp Gly Gln Gly Thr
            100                 105                 110

Leu Val Thr Val Ser Ser
        115

<210> SEQ ID NO 19
<211> LENGTH: 113
<212> TYPE: PRT
<213> ORGANISM: Artificial Sequence
<220> FEATURE:
<223> OTHER INFORMATION: Nivolumab heavy chain variable domain

<400> SEQUENCE: 19

Gln Val Gln Leu Val Glu Ser Gly Gly Gly Val Val Gln Pro Gly Arg
1               5                   10                  15

Ser Leu Arg Leu Asp Cys Lys Ala Ser Gly Ile Thr Phe Ser Asn Ser
            20                  25                  30
```

```
Gly Met His Trp Val Arg Gln Ala Pro Gly Lys Gly Leu Glu Trp Val
            35                  40                  45

Ala Val Ile Trp Tyr Asp Gly Ser Lys Arg Tyr Tyr Ala Asp Ser Val
 50                      55                  60

Lys Gly Arg Phe Thr Ile Ser Arg Asp Asn Ser Lys Asn Thr Leu Phe
 65                  70                  75                  80

Leu Gln Met Asn Ser Leu Arg Ala Glu Asp Thr Ala Val Tyr Tyr Cys
                 85                  90                  95

Ala Thr Asn Asp Asp Tyr Trp Gly Gln Gly Thr Leu Val Thr Val Ser
            100                 105                 110

Ser

<210> SEQ ID NO 20
<211> LENGTH: 109
<212> TYPE: PRT
<213> ORGANISM: Artificial Sequence
<220> FEATURE:
<223> OTHER INFORMATION: VL from Ipilimumab

<400> SEQUENCE: 20

Glu Ile Val Leu Thr Gln Ser Pro Gly Thr Leu Ser Leu Ser Pro Gly
 1               5                  10                  15

Glu Arg Ala Thr Leu Ser Cys Arg Ala Ser Gln Ser Val Gly Ser Ser
                 20                  25                  30

Tyr Leu Ala Trp Tyr Gln Gln Lys Pro Gly Gln Ala Pro Arg Leu Leu
             35                  40                  45

Ile Tyr Gly Ala Phe Ser Arg Ala Thr Gly Ile Pro Asp Arg Phe Ser
 50                      55                  60

Gly Ser Gly Ser Gly Thr Asp Phe Thr Leu Thr Ile Ser Arg Leu Glu
 65                  70                  75                  80

Pro Glu Asp Phe Ala Val Tyr Tyr Cys Gln Gln Tyr Gly Ser Ser Pro
                 85                  90                  95

Trp Thr Phe Gly Gln Gly Thr Lys Val Glu Ile Lys Arg
            100                 105

<210> SEQ ID NO 21
<211> LENGTH: 118
<212> TYPE: PRT
<213> ORGANISM: Artificial Sequence
<220> FEATURE:
<223> OTHER INFORMATION: VH from Ipilimumab

<400> SEQUENCE: 21

Gln Val Gln Leu Val Glu Ser Gly Gly Gly Val Val Gln Pro Gly Arg
 1               5                  10                  15

Ser Leu Arg Leu Ser Cys Ala Ala Ser Gly Phe Thr Phe Ser Ser Tyr
                 20                  25                  30

Thr Met His Trp Val Arg Gln Ala Pro Gly Lys Gly Leu Glu Trp Val
             35                  40                  45

Thr Phe Ile Ser Tyr Asp Gly Asn Asn Lys Tyr Tyr Ala Asp Ser Val
 50                      55                  60

Lys Gly Arg Phe Thr Ile Ser Arg Asp Asn Ser Lys Asn Thr Leu Tyr
 65                  70                  75                  80

Leu Gln Met Asn Ser Leu Arg Ala Glu Asp Thr Ala Ile Tyr Tyr Cys
                 85                  90                  95

Ala Arg Thr Gly Trp Leu Gly Pro Phe Asp Tyr Trp Gly Gln Gly Thr
            100                 105                 110
```

Leu Val Thr Val Ser Ser
        115

<210> SEQ ID NO 22
<211> LENGTH: 246
<212> TYPE: PRT
<213> ORGANISM: Artificial Sequence
<220> FEATURE:
<223> OTHER INFORMATION: 3GSWT

<400> SEQUENCE: 22

Glu Ile Val Leu Thr Gln Ser Pro Gly Thr Leu Ser Leu Ser Pro Gly
1               5                   10                  15

Glu Arg Ala Thr Leu Ser Cys Arg Ala Ser Gln Ser Val Gly Ser Ser
            20                  25                  30

Tyr Leu Ala Trp Tyr Gln Gln Lys Pro Gly Gln Ala Pro Arg Leu Leu
        35                  40                  45

Ile Tyr Gly Ala Phe Ser Arg Ala Thr Gly Ile Pro Asp Arg Phe Ser
    50                  55                  60

Gly Ser Gly Ser Gly Thr Asp Phe Thr Leu Thr Ile Ser Arg Leu Glu
65                  70                  75                  80

Pro Glu Asp Phe Ala Val Tyr Tyr Cys Gln Gln Tyr Gly Ser Ser Pro
                85                  90                  95

Trp Thr Phe Gly Gln Gly Thr Lys Val Glu Ile Lys Arg Gly Gly Gly
            100                 105                 110

Gly Ser Gly Gly Gly Gly Ser Gly Gly Gly Gly Ser Gly Gly Gly Gly
        115                 120                 125

Gln Val Gln Leu Val Glu Ser Gly Gly Val Val Gln Pro Gly Arg
    130                 135                 140

Ser Leu Arg Leu Ser Cys Ala Ala Ser Gly Phe Thr Phe Ser Ser Tyr
145                 150                 155                 160

Thr Met His Trp Val Arg Gln Ala Pro Gly Lys Gly Leu Glu Trp Val
                165                 170                 175

Thr Phe Ile Ser Tyr Asp Gly Asn Asn Lys Tyr Tyr Ala Asp Ser Val
            180                 185                 190

Lys Gly Arg Phe Thr Ile Ser Arg Asp Asn Ser Lys Asn Thr Leu Tyr
        195                 200                 205

Leu Gln Met Asn Ser Leu Arg Ala Glu Asp Thr Ala Ile Tyr Tyr Cys
    210                 215                 220

Ala Arg Thr Gly Trp Leu Gly Pro Phe Asp Tyr Trp Gly Gln Gly Thr
225                 230                 235                 240

Leu Val Thr Val Ser Ser
                245

<210> SEQ ID NO 23
<211> LENGTH: 258
<212> TYPE: PRT
<213> ORGANISM: Artificial Sequence
<220> FEATURE:
<223> OTHER INFORMATION: 5GSWT

<400> SEQUENCE: 23

Glu Ile Val Leu Thr Gln Ser Pro Gly Thr Leu Ser Leu Ser Pro Gly
1               5                   10                  15

Glu Arg Ala Thr Leu Ser Cys Arg Ala Ser Gln Ser Val Gly Ser Ser
            20                  25                  30

Tyr Leu Ala Trp Tyr Gln Gln Lys Pro Gly Gln Ala Pro Arg Leu Leu
        35                  40                  45

-continued

```
Ile Tyr Gly Ala Phe Ser Arg Ala Thr Gly Ile Pro Asp Arg Phe Ser
 50                  55                  60
Gly Ser Gly Ser Gly Thr Asp Phe Thr Leu Thr Ile Ser Arg Leu Glu
 65                  70                  75                  80
Pro Glu Asp Phe Ala Val Tyr Tyr Cys Gln Gln Tyr Gly Ser Ser Pro
                 85                  90                  95
Trp Thr Phe Gly Gln Gly Thr Lys Val Glu Ile Lys Arg Ala Gly Gly
            100                 105                 110
Gly Gly Ser Gly Gly Gly Gly Ser Gly Gly Gly Gly Ser Gly Gly Gly
            115                 120                 125
Gly Ser Gly Gly Gly Gly Ser Gly Gly Gly Gly Ser Gln Val Gln Leu
            130                 135                 140
Val Glu Ser Gly Gly Gly Val Val Gln Pro Gly Arg Ser Leu Arg Leu
145                 150                 155                 160
Ser Cys Ala Ala Ser Gly Phe Thr Phe Ser Ser Tyr Thr Met His Trp
                165                 170                 175
Val Arg Gln Ala Pro Gly Lys Gly Leu Glu Trp Val Thr Phe Ile Ser
            180                 185                 190
Tyr Asp Gly Asn Asn Lys Tyr Tyr Ala Asp Ser Val Lys Gly Arg Phe
            195                 200                 205
Thr Ile Ser Arg Asp Asn Ser Lys Asn Thr Leu Tyr Leu Gln Met Asn
210                 215                 220
Ser Leu Arg Ala Glu Asp Thr Ala Ile Tyr Tyr Cys Ala Arg Thr Gly
225                 230                 235                 240
Trp Leu Gly Pro Phe Asp Tyr Trp Gly Gln Gly Thr Leu Val Thr Val
                245                 250                 255
Ser Ser
```

```
<210> SEQ ID NO 24
<211> LENGTH: 7
<212> TYPE: PRT
<213> ORGANISM: Artificial Sequence
<220> FEATURE:
<223> OTHER INFORMATION: homology region
<220> FEATURE:
<221> NAME/KEY: VARIANT
<222> LOCATION: 2, 6
<223> OTHER INFORMATION: Xaa = any amino acid

<400> SEQUENCE: 24

Pro Xaa Thr Phe Gly Xaa Gly
1               5

<210> SEQ ID NO 25
<211> LENGTH: 7
<212> TYPE: PRT
<213> ORGANISM: Artificial Sequence
<220> FEATURE:
<223> OTHER INFORMATION: homology region
<220> FEATURE:
<221> NAME/KEY: VARIANT
<222> LOCATION: 1, 2, 5, 7
<223> OTHER INFORMATION: Xaa = any amino acid

<400> SEQUENCE: 25

Xaa Xaa Trp Val Xaa Gln Xaa
1               5

<210> SEQ ID NO 26
<211> LENGTH: 7
```

-continued

```
<212> TYPE: PRT
<213> ORGANISM: Artificial Sequence
<220> FEATURE:
<223> OTHER INFORMATION: homology region
<220> FEATURE:
<221> NAME/KEY: VARIANT
<222> LOCATION: 1, 3, 6
<223> OTHER INFORMATION: Xaa = any amino acid

<400> SEQUENCE: 26

Xaa Asp Xaa Trp Gly Xaa Gly
1               5
```